United States Patent
Dwyer, III et al.

(10) Patent No.: US 8,892,507 B1
(45) Date of Patent: *Nov. 18, 2014

(54) PROVIDING FILE SYSTEM QUOTA SUPPORT FOR A FILE SYSTEM HAVING SEPARATED DATA AND METADATA

(71) Applicant: EMC Corporation, Hopkinton, MA (US)

(72) Inventors: Thomas J. Dwyer, III, Sunnyvale, CA (US); Ravi Wijayaratne, San Jose, CA (US); Daniel A. Muntz, Cupertino, CA (US); David Noveck, Lexington, MA (US); Sairam Veeraswamy, South Grafton, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/937,566

(22) Filed: Jul. 9, 2013

Related U.S. Application Data

(63) Continuation of application No. 13/433,602, filed on Mar. 29, 2012, now Pat. No. 8,515,904.

(51) Int. Cl.
*G06F 17/00* (2006.01)
*G06F 17/30* (2006.01)
*G06F 21/62* (2013.01)

(52) U.S. Cl.
CPC ...... *G06F 17/30194* (2013.01); *G06F 21/6218* (2013.01)
USPC ........... 707/609; 707/783; 707/822; 711/112; 711/156; 711/163

(58) Field of Classification Search
CPC ............ G06F 21/6218; G06F 11/1458; G06F 17/30067; G06F 2009/4557
USPC .......... 707/783, 645, 827, E17.005, 609, 822; 711/163, 165, 170, 112, 156
See application file for complete search history.

(56) References Cited

U.S. PATENT DOCUMENTS 7,440,911 B1 * 10/2008 Fors et al. ..................... 705/26.4
7,653,560 B2 * 1/2010 Hueler .............................. 705/4

(Continued)

OTHER PUBLICATIONS

J. Froud, K. Williams, C. Haslam, S. Johal, J. Williams—"Caterpillar: Two stories and an argumen"—Accounting, Organizations and Society—vol. 23, Issue 7, Oct. 1998, pp. 685-708.*

(Continued)

*Primary Examiner* — Anh Ly
(74) *Attorney, Agent, or Firm* — Muirhead and Saturnelli, LLC

(57) ABSTRACT

Described are techniques for performing quota management in a distributed file system. An allocation quota specifies an upper limit of storage for allocation for a quota set of the distributed file system. The distributed file system includes metadata file system(s) and data file system(s). For files in the distributed file system, metadata is stored in one of the metadata file systems and file content data is stored in the data file systems. A quota coordinator partitions the allocation quota among the data file systems. The data file systems are allocators of storage and each receives a portion of the allocation quota specifying an upper limit of storage that the data file system has available for allocation for the quota set. Storage is allocated for client requests. The storage allocation is performed by each of the data file systems in accordance with the portion of the allocation quota assigned.

20 Claims, 19 Drawing Sheets

(56) References Cited

U.S. PATENT DOCUMENTS

| | | | |
|---|---|---|---|
| 7,721,194 B2* | 5/2010 | Ozzie et al. | 715/234 |
| 2004/0044591 A1* | 3/2004 | Gilliland et al. | 705/27 |
| 2004/0049513 A1* | 3/2004 | Yakir et al. | 707/100 |
| 2004/0267872 A1* | 12/2004 | Serdy et al. | 709/200 |
| 2005/0015409 A1* | 1/2005 | Cheng et al. | 707/200 |
| 2005/0021566 A1* | 1/2005 | Mu | 707/200 |
| 2006/0069665 A1* | 3/2006 | Yamakawa et al. | 707/1 |
| 2007/0050311 A1* | 3/2007 | Mohr et al. | 705/400 |
| 2010/0115009 A1* | 5/2010 | Callahan et al. | 707/825 |
| 2010/0121893 A1* | 5/2010 | Uhrhane et al. | 707/822 |
| 2010/0250497 A1* | 9/2010 | Redlich et al. | 707/827 |
| 2011/0119461 A1* | 5/2011 | Desai et al. | 711/166 |
| 2012/0278289 A1* | 11/2012 | Urano et al. | 707/674 |
| 2013/0024424 A1* | 1/2013 | Prahlad et al. | 707/640 |

OTHER PUBLICATIONS

Alor-Hernandez, G., Juarez-Martinez, U., Posada-Gomez, R. and Chavez-Trejo, A.M—"Defining an SOA for Stock Quote Management"—Computer Science (ENC), 2009 Mexican International Conference on—Sep. 21-25, 2009—pp. 315-318.*

* cited by examiner

250

| 260 | User1 quota 80KB | | Free space 20KB | |
|---|---|---|---|---|
| | Allocator | Allocated (A) | Reserved (R) | Bound(B) |
| 272 | DSFS A | 8KB | 12KB | 20KB |
| 274 | DSFS B | 8KB | 12KB | 20KB |
| 276 | DSFS C | 8KB | 12KB | 20KB |

270

282 — DSFS A  Allocated (A)  Reserved (R)  Bound(B)
       8KB           12KB          20KB 284 — DSFS B  Allocated (A)  Reserved (R)  Bound(B)
       8KB           12KB          20KB 286 — DSFS C  Allocated (A)  Reserved (R)  Bound(B)
       8KB           12KB          20KB

FIGURE 4

PROVIDING FILE SYSTEM QUOTA SUPPORT FOR A FILE SYSTEM HAVING SEPARATED DATA AND METADATA

RELATED APPLICATIONS

This application is a continuation of U.S. patent application Ser. No. 13/433,602, now U.S. Pat. No. 8,515,904 B1, filed Mar. 29, 2013, PROVIDING FILE SYSTEM QUOTA SUPPORT FOR A FILE SYSTEM HAVING SEPARATED DATA AND METADATA, which is incorporated by reference herein.

BACKGROUND

1. Technical Field

This application relates to file systems and more particularly to techniques used in connection with providing file system quota support for a file system having separated data and metadata.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Host systems may receive requests from clients in accordance with a variety of different protocols and different versions thereof including, for example, file access protocols, and block service requests. With a file access protocol, clients issue requests to access a file system. For example, a client may issue requests to read and write data of one or more files of the file system. Such clients may not have direct access to the underlying storage but rather interact with one or more hosts acting as file servers providing file system services to perform client requests based on a particular file access protocol.

File systems may implement one or more types of quotas in order to limit resources utilized. For example, a file system may implement per-user storage quotas whereby a quota may be specified that is a limit or upper bound as to the storage capacity that a particular user may consume. In a similar manner, a file system may implement other types of quotas of varying levels of granularity. For example, a file system may implement quota limits for a defined group of users, one or more directories, and the like, as may vary with the particular file system.

BRIEF DESCRIPTION OF THE DRAWINGS

Features and advantages of the present invention will become more apparent from the following detailed description of exemplary embodiments thereof taken in conjunction with the accompanying drawings in which:

FIGS. 4-10 are examples of information that may be utilized in connection with various examples illustrating quota management in an embodiment in accordance with techniques herein;

DETAILED DESCRIPTION OF EMBODIMENT(S)

Figure 1:
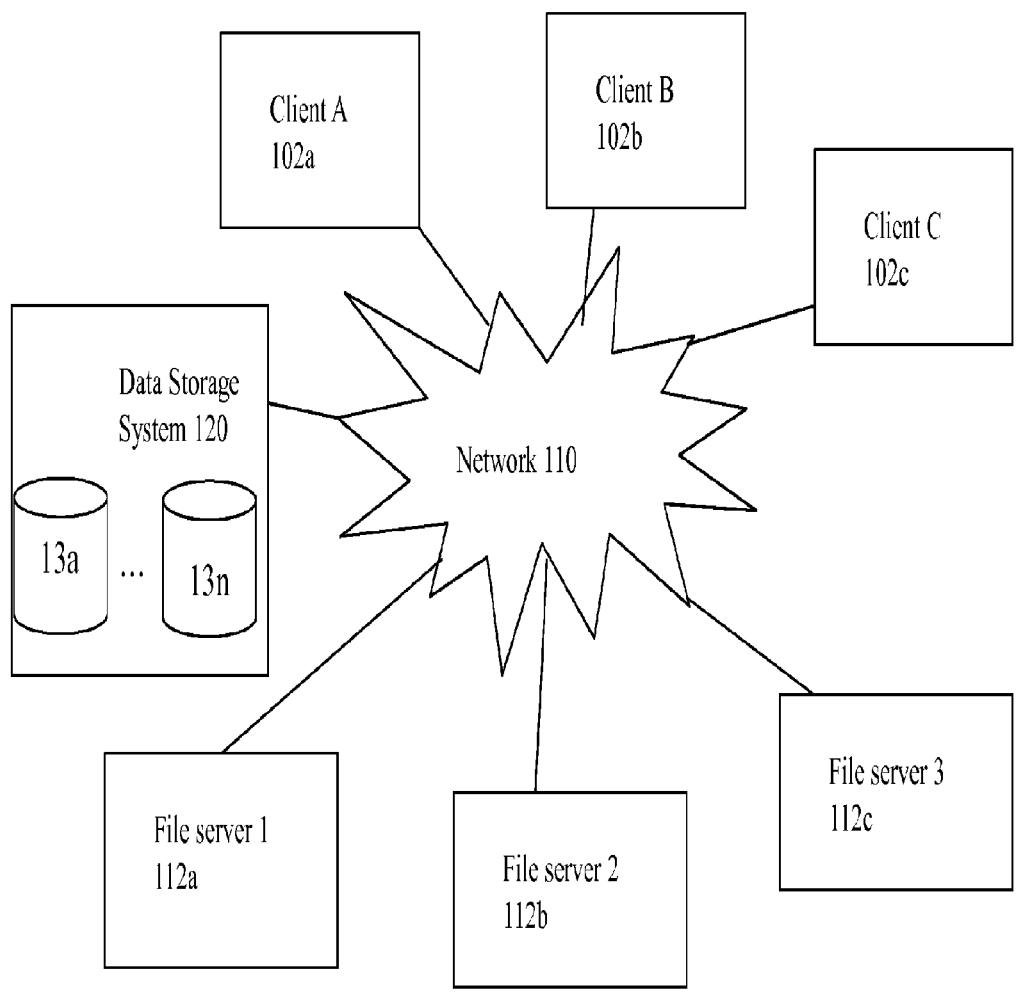
FIG. 1 is an example illustrating clients and file servers in a network configuration in an embodiment in accordance with techniques herein.

Referring to FIG. 1, shown is an example of a system and network including components in an embodiment in accordance with techniques herein. The example 100 includes client computer systems 102a-c, data storage system 120, network 110 and file servers 112a-c. The data storage system 120 may including one or more data storage systems as described elsewhere herein. Each of 112a-c, 102a-c and 120 may communicate with each other over network 110. Although a particular number of clients and file servers are illustrated in the example 100, an embodiment may include generally any number of one or more clients and one or more file servers for use in connection with techniques herein. Each of the file servers 112a-c may be a suitable computer system for use in connection with processing received client requests. The clients 102a-c may be any computer system such as a laptop or desktop computer. As described in more detail below, the file systems and associated services provided by file servers 112a-c may comprise a federated distributed file system in accordance with techniques herein. The file servers 112a-112c may collectively serve as a front end to the entire distributed file system comprising multiple file systems whereby such file servers provide for parallelism and scalability as will be appreciated by those of ordinary skill in the art. The network 110 may be an IP (internet protocol) network.

The data storage system 120 may represent one or more data storage systems, such as one or more data storage arrays by EMC Corporation of Hopkinton, Mass. that include a plurality of physical storage devices 13a-13n, such as, for example, rotational disk drives, flash-memory based storage media (e.g., solid state storage devices), and other forms of storage media known in the art. It should be noted that element 120 may represent a single data storage system, such as a single data storage array, or multiple data storage systems (such as multiple data storage arrays) that may be configured in any suitable arrangement such as a storage area network (SAN). The file servers 112a-112c may communicate with the data storage system in connection with performing operations on data, such as files, stored on storage devices 13-13n. Furthermore, the clients 102a-102c may communicate with the file servers 112a-112c in connection with servicing client requests to access data stored on the storage system 120. For example, as described and illustrated in more detail elsewhere in connection with techniques herein, the client 102a may issue a request to write to a file whereby the request is sent from the client 102a to one of the file servers, such as file server 112a. In response, the file server 112a may communicate with the data storage system 120 to perform processing to write the requested data to the file to one or more of the physical storage devices 13a-13n. The file servers 112a-112c may provide data and access control information to the storage system 120 through channels and the storage system 120 may provide data to the file servers 112a-112c through the channels. The servers 112a-112c may not directly address the physical drives of the storage system 120 but may rather access data from what the servers view as a plurality of logical devices or logical volumes (LVs) as well as using file-based access techniques through other software layers described elsewhere herein.

Figure 2:
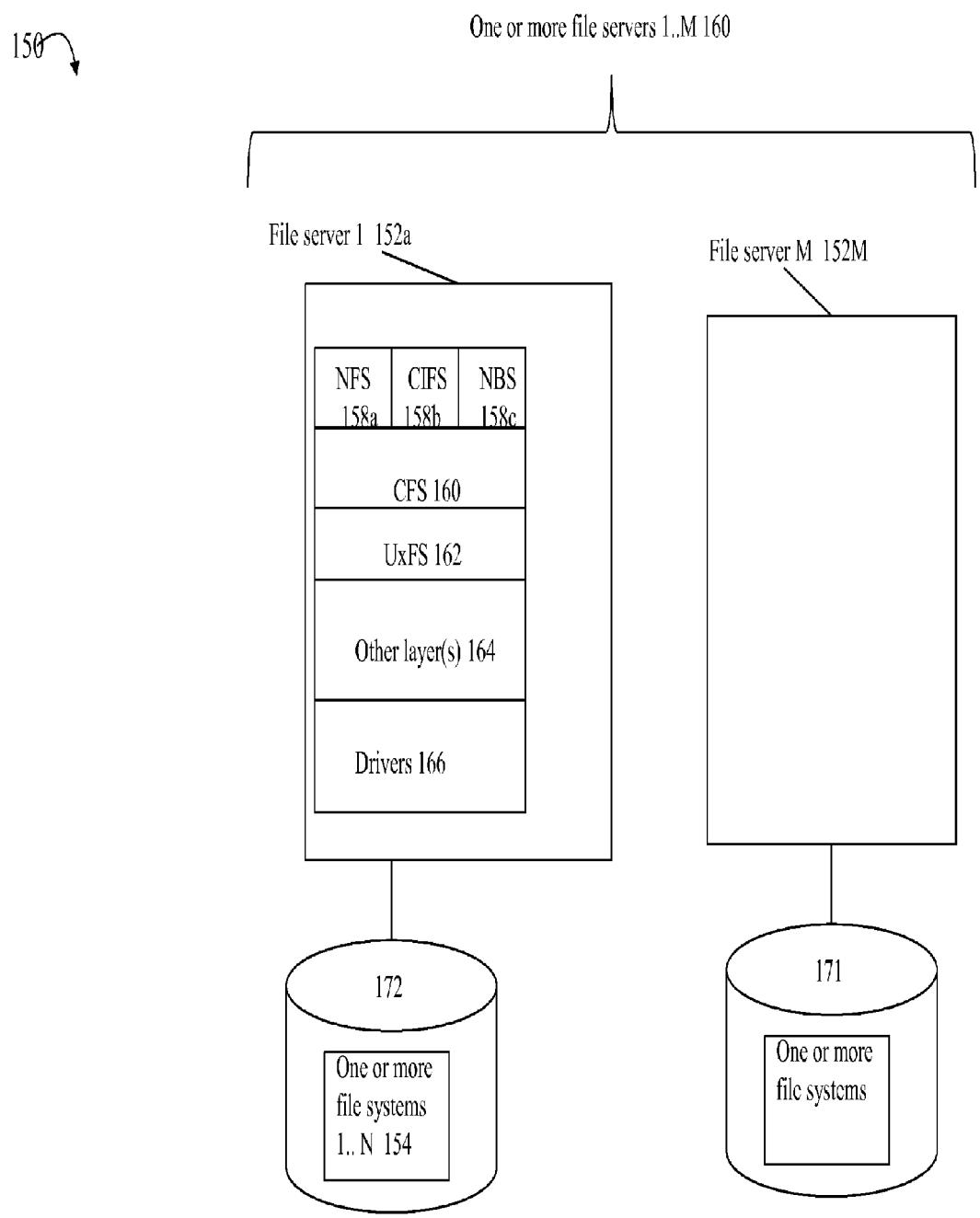
FIG. 2 is an example illustrating further detail of the one or more file servers as may be included in an embodiment in accordance with techniques herein.

Referring to FIG. 2, shown is an example providing further detail regarding the file servers as may be included in an embodiment in accordance with techniques herein. The example 150 generally illustrates that an embodiment may include any number of M file servers 160, M being an integer of one (1) or more. The M file servers may be included in a federated file system in an embodiment having a distributed architecture as described herein. Details are provided regarding a single file server 152a for illustration where file server 152a may include the illustrated set of components and may store data for one or more file systems 154 on storage devices denoted generally by element 172. However, each of the M file servers may include similar components as illustrated for 152a and may store data for additional one or more file systems on a storage device in a manner similar to that as illustrated for 152a. For example, each of the file servers 152a-152M may include a set of components 158a-c, 160, 162, 164, 166, where each of the file servers 152a-152M may store data for one or more file systems on one or more storage devices. The file server 152a may be a multi-protocol file server able to communicate with clients in a variety of different protocols.

The file server 1 152a may communicate with the other network devices such as the clients using standard file access protocols such as the Network File System (NFS) or the Common Internet File System (CIFS) protocols. The file server 152s may utilize an operating system such as a Unix-based operating system or an embedded operating system. The file server 152a may include a Network File System (NFS) module 158a for supporting communication among the clients and the server 152a over the IP network 110 using the NFS file access protocol. The server 152a may also include a Common Internet File System (CIFS) module 158b for supporting communication over the IP network using the CIFS file access protocol. The server 152a may also include a network block services (NBS) module 158c for exporting to the clients LVs as may be included in a storage device 172 of the data storage system 120. The NFS module 158a, the CIFS module 158b, and the NBS module 158c may be layered over a Common File System (CFS) module 160, and the CFS module may be layered over one or more physical file systems, each of which implement a specified file system interface (such as a Virtual File System interface). Such physical file systems include support for persistent data structures required to implement the protocol supported, such as those to support CIFS and NFS. An example of such a physical file system is a UnixFile System (UxFS) module 162. The UxFS module supports a UNIX-based file system, and the CFS module provides higher-level functions common to NFS, CIFS, and NBS. One or more other layers 164 may be included under the UxFS layer 162 whereby the lowest such layer(s) represented by 164 may communicate with one or more drivers 166. The drivers 166 may include, for example, FC, SCSI or iSCSI drivers to facilitate communications between the adapters or interfaces of the server 152a and the data storage system. The file server 152a may also include other components than as described herein.

The NFS protocol may be used to receive file access commands from clients using, for example, the UNIX™ operating system or the LINUX™ operating system. The CIFS protocol may be used to receive file access commands from clients using, for example, the Microsoft (MS) Windows® operating system. The NFS protocol is described, for example, in "NFS: Network File System Protocol Specification," Network Working Group, Request for Comments: 1094, Sun Microsystems, Inc., Santa Clara, Calif., March 1989, 27 pages, and in S. Shepler et al., "Network File System (NFS) Version 4 Protocol," Network Working Group, Request for Comments: 3530, The Internet Society, Reston, Va., April 2003, 262 pages. The CIFS protocol is described, for example, in Paul J. Leach and Dilip C. Naik, "A Common Internet File System (CIFS/1.0) Protocol," Network Working Group, Internet Engineering Task Force, The Internet Society, Reston, Va., Dec. 19, 1997, 121 pages, and "Implementing CIFS: The Common Internet File System", Christopher Hertel, Prentice Hall Professional Technical Reference, 2003, ISBN ISBN:013047116X.

An embodiment in accordance with techniques herein may also process client requests of different versions of the same protocol such as, for example, NFS V3.0, NFS V4.0 and/or NFS V4.1. NFS V 4.1 provides protocol support to take advantage of clustered server deployments including an extension (that may be referred to as pNFS (parallel NFS) extension) to provide scalable parallel access to files distributed among multiple servers. The pNFS functionality may be included in such a protocol supported in an embodiment in accordance with techniques herein.

In connection with file access protocols as may be used by a client, the file server 152a may be used in connection with servicing client requests to access files of a distributed file system in an embodiment in accordance with techniques herein. The distributed file system as will be described in more detail elsewhere includes two or more file systems. More specifically, the distributed file system in accordance with techniques herein includes one or more metadata file systems (MDFSs) and one or more data file systems or data storage file systems (DSFSs). Each MDFS stores metadata about files in the file system and each DSFS stores file content data. For a given file of the file system, the file's metadata is stored in a file system (e.g., an MDFS) separate from its corresponding file data or content which is stored in one or more DSFSs. The file's data may be striped across multiple DFSs where the striping size may possibly vary on a per file basis. For such a federated distributed file system, the techniques herein further provide for implementation of file system quotas. In one embodiment described herein, a quota may be specified indicating a limit or upper bound on storage that may be allocated for a quota set, such as a portion of files and/or directories of the distributed file system namespace having an attribute for a particular user. Other examples and a further description of quotas and quota sets are described elsewhere herein. For the quota set, the quota indicating the allocation limit for the quota set may be partitioned or distributed in portions among one or more components each functioning as a storage allocator that may allocate storage for the quota set such as in response to servicing a client request. A component functioning as the storage coordinator may communicate with the allocators as needed in connection with performing file system quota management for the file system in accordance with the allocation quotas. In one embodiment of techniques herein, each DSFS may be an allocator and the MDFS may be the coordinator. The MDFS may also be both an allocator and the coordinator. More generally, any component that may allocate storage with respect to specified allocation quotas may be an allocator and any suitable component (e.g., MDFS or another component other than the MDFS) may be the coordinator. The foregoing and other features of techniques herein are described in more detail elsewhere herein.

With reference to FIG. 2, file server 152a may service requests for one or more file systems (denoted 1 . . . N) 154 having data storage on one or more storage devices 172 of the data storage system. In accordance with techniques herein, the N file systems denoted by 154 may be included in a collective federated file system having a global name space. Each file system instance denoted as one of the N file systems of 154 may be either an MDFS or a DSFS. Each of the N file systems (N being an integer having a value of 1 (one) or more) may include its own file system metadata and includes data which may be either metadata (if the file system is a MDFS) or file content data (if the file system is a DSFS) for a file in the distributed file system. For example, consider the case of a distributed file system where file server 152a includes a single MDFS and another three different file servers denoted by 160 each include a single DSFS. The MDFS may include the metadata for all files of the distributed file system and the other 3 file servers may include the file content data for all files of the distributed file system. The MDFS itself as a file system includes its own appropriate file system metadata and further includes metadata files for files of the distributed file system. In a similar manner a DSFS of the distributed file system may include its own file system metadata and further includes as its content data the file content data for files of the distributed file system. In this manner, a file X of the distributed file system has its metadata partitioned from its file content data whereby X's metadata is stored in the MDFS (e.g., files of the MDFS contain X's metadata) and X's file content data is stored in one or more DSFS (e.g., files of the DSFS contain X's file content data).

One embodiment of the techniques herein may include a single file server that includes both the MDFS and one or more DSFSs. To provide for greater scalability and efficiency, another embodiment of the techniques herein may include each of the MDFSs and each of the DSFSs on a different file server. As yet another variation, a single file server may include a single MDFS including all the distributed file system metadata and one or more other servers may each include multiple DSFSs. An embodiment may include multiple MDFSs wherein each MDFS may include metadata files for a portion of the files in a distributed file system. Embodiments may include these and other variations as described and represented herein.

With respect to a file in the distributed file system, the file's metadata is a data descriptor that describes the file and the file content or data. Metadata means data about the file data. Metadata for a file may, for example, include location information (also more generally referred to elsewhere herein as layout information) identifying the locations on one or more server systems where the file content is stored, and various file attributes (e.g., describing access control or file permissions, file owner, date the file was last accessed, date the file was last written to/modified, size of the file, and the like. Metadata may also be included about the file system (file system metadata) such as describing a file system's directory structure. In an embodiment in accordance with techniques herein, the MDFS may contain the file metadata for files of the distributed file system and may include layout information identifying where various logical portions of the file data reside (e.g., which one or more DSFSs include various logical portions of the file X's data or content such as if file X's data is striped across multiple DSFSs). Additionally, the MDFS may include the file directory structure for the distributed file system.

In an embodiment including a single MDFS, the MDFS includes a single metadata file for each file in the distributed file system. The file content data for each file may be located in one or more DSFSs depending on the embodiment, whether striping is utilized, and if so, depending on the stripe size and the size of the file contents. For example, consider the case where two DSFSs are used in an embodiment with a stripe size of 8 KB. If the length of the file contents is 16 KB, the first 8 KB portion (e.g., 1-8 KB) may be stored on a first DSFS and the second remaining 8 KB portion (8 KB+1 through 16 KB) may be stored on a second DSFS. If the file size is increased by another third 8 KB (having file relative offset locations of (16 KB+1 through 24 KB), the third 8 KB portion may be stored in the first DSFS. An embodiment may also provide for optimizations or special cases, for example, where file content is less than a threshold small amount (e.g., perhaps less than a stripe size) and in such cases, the file content would be stored in the MDFS itself.

It should be noted that particular values, such as stripe size of 8 KB, and others used herein are merely exemplary and have been selected for simplistic purposes of illustration of the techniques herein. As will be appreciated by those skilled in the art, the stripe size of 8 KB is not a typical stripe size as would actually be used but has been selected for purposes of ease and simplicity of illustration in connection with examples herein.

An embodiment may also provide for a single stripe size for all files, may have a varying or customized stripe size that may vary per file, for a single data file, and/or may have multiple stripe sizes for different corresponding parts of a same file (e.g., portion 1 of FILE 1 has a first stripe size and portion 2 of FILE 1 has a second different stripe size).

The MDFS may perform processing in connection with providing metadata for a file of the distributed file system. The metadata for the file may include information such as the attributes and other properties described above. The metadata for the file may also include layout data which identifies where the different portions of the file content data are stored as also described above. The layout data (as utilized by the MDFS and as may be included in a metadata file) may generally identify where the different portions of file content data are stored.

In an embodiment including a single MDFS on a first server and multiple DSFSs located on different servers, a client may communicate using the pNFS protocol. The client may request the metadata from the MDFS and then subsequently the client may directly issue in parallel multiple requests to the different servers including the DSFSs. An embodiment in accordance with techniques herein may provide for determining and recognizing a protocol used by a client and may perform additional processing to take advantage of the distributed file system described herein when the client does not communicate using the pNFS protocol. In accordance with techniques herein, the file server(s) may process client requests where the client does not communicate using the pNFS protocol and where the client may furthermore communicate in accordance with a protocol that does not utilize some aspects of metadata. For example, a client may communicate in accordance with a version of an NFS protocol that does not utilize or recognize layout information. In such a case, for example, the client may communicate using a protocol such as NFS V3.0 and issue a request to the MDFS for file data. The client would expect the MDFS to simply return to the client the requested data. In this case, the MDFS (and/or other components in communication with the MDFS) may perform additional processing on behalf of the client request to take advantage of the distributed architecture of the distributed file system and file servers. The MDFS (or other component in communication with the MDFS) may perform processing to determine from the layout information of the file metadata the particular DSFSs which include the requested file content. The MDFS or other such component may issue requests in parallel directly to the particular DSFSs to obtain the requested data portions of the file. The MDFS may then return the requested data directly to the client. In this manner, the client request results in the MDFS indirectly obtaining the file content data for the client request for the client. Thus, the software of the file server including the MDFS may orchestrate or coordinate obtaining the requested file content data in parallel for the client request.

It should be noted that the particular protocol including the protocol version used by a client may be included in information providing the client in an initial message exchange (e.g., such as parameters of a command as described elsewhere herein).

Figure 3:
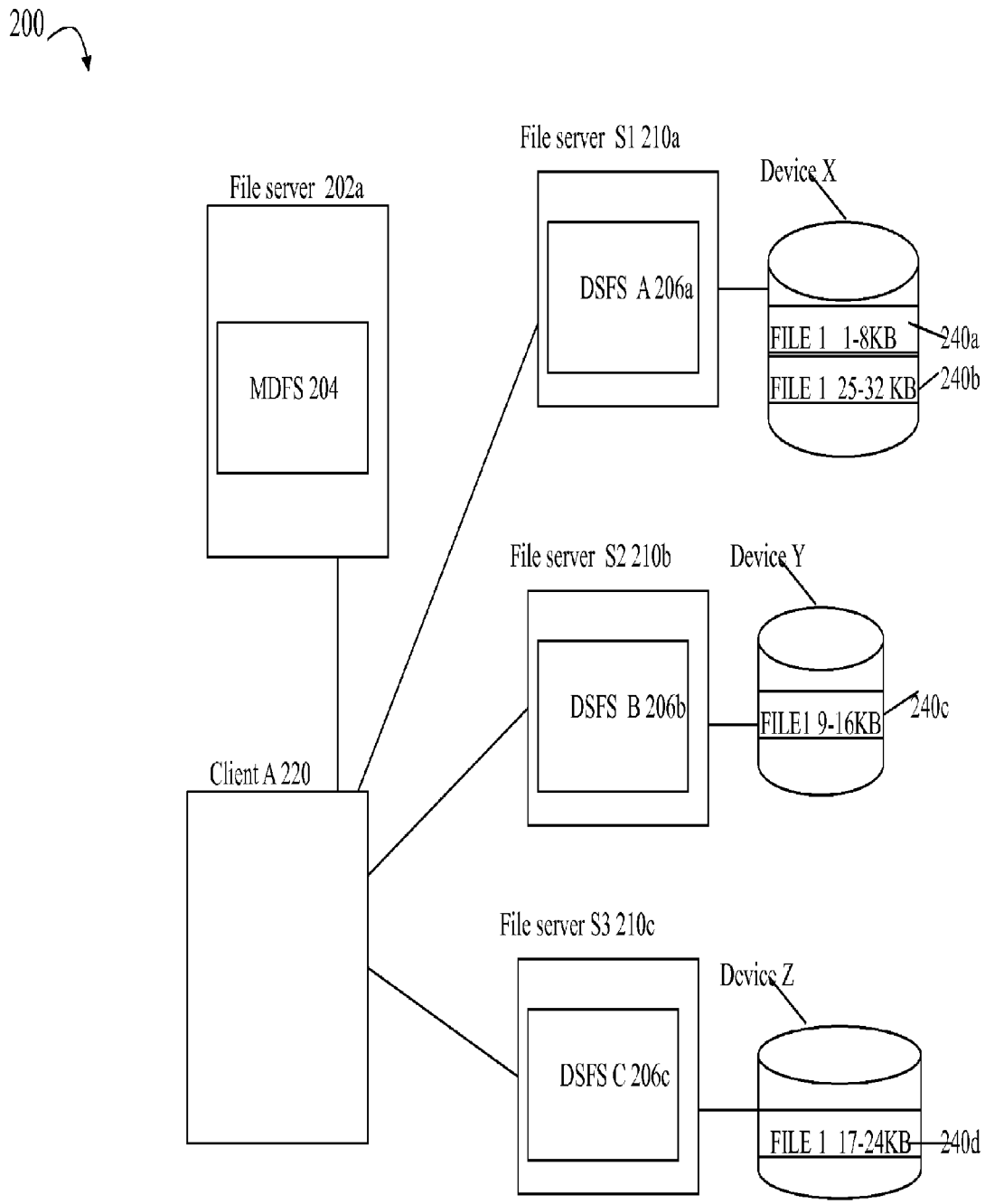
FIG. 3 is an example illustrating a distributed file system and components thereof as may be included in an embodiment in accordance with techniques herein.

Referring to FIG. 3, shown is an example of an embodiment in accordance with techniques herein. The example 200 illustrates an embodiment including file servers 202a, and 210a-210c. The MDFS 204 for the distributed file system may be located on or hosted by file server 202a. The distributed file system may also include file servers S1 210a, S2 210b and S3 210c each including a different single DSFS. Server S1 210a includes DSFS 206a. Server S2 210b includes DSFS 206b and server S3 206c includes DSFS 206c. Devices X, Y and Z may denote data storage devices of a data storage system used to store file content data by the servers 210a-210c. The client A 220 may issue a request to the MDFS 204 to obtain the metadata for FILE1 whereby, as known in the art, such metadata may include the layout information for FILE 1 identifying where different logical portions of FILE1's data are located on the different DSFSs and associated file servers. With reference to FIG. 3, data for files such as FILE 1 may be striped across the DSFSs 206a-206c in 8 KB stripes.

In a first example with reference to FIG. 3, assume that client A 220 communicates using pNFS and therefore requests the layout information for FILE 1. The layout information may denote that FILE1 has file data content partitioned into 4 portions—a first portion including kilobytes (KBs) 1-8 as stored on DSFS 206a at file server S1 210a, a second portion including KBs 9-16 as stored on DSFS 206b at file server S2 210b, a third portion including KBs 17-24 as stored on DSFS 206c at file server S3 210c, and a fourth portion including KBs 25-32 as stored on DSFS 206a at file server S1 210a. It should be noted that the above-mentioned four portions of FILE1 are illustrated using a 1-based logical address range associated with FILE1 and that an actual embodiment may use other variations such as 0-based logical address ranges and offsets for files, devices, and the like. Additionally, as will be appreciated by those skilled in the art, the layout information for a file such as FILE1 may not explicitly specify where each portion or stripe of the file is stored on a particular DSFS. Rather, the layout information, such as obtained from an MDFS and also stored for use by the client, may specify a pattern of rotation for storing striped portions of the file among the DSFSs allowing the client to thereby infer upon which DSFS each stripe.

In this manner, the client A 220 may issue a request to MDFS 204 and obtain the layout information for FILE 1, and then directly communicate with any two or more of the files servers 210a-210e in parallel to perform data access operations (e.g., read and write operations) on any of the 4 data portions of FILE 1 desired. The layout information returned to the client may be in a form in accordance with a standard utilized by the client. The client 220 may be an NFS V4.1 client which operates in accordance with the pNFS protocol. The client 220 may now communicate directly with the DSFSs on the various file servers to access the desired data portions for reading, writing and the like, using the returned layout information for the data portion(s). For example, the client 220 may issue a request to DSFS 206a on file server S1 210a to write to the first data portion 240a of FILE 1. The client may also update the portions of FILE1's metadata by communicating such updates to the MDFS 204.

If the client 220 utilizes a protocol or version whereby the client does not have support for requesting or using layout information for the file, the client 220 may send the request such as to read or write data directly to the MDFS 204 and expect the MDFS 204 to handle processing for the requested read or write operation without the client ever requesting the layout information and without having the client directly contact the various DSFSs. Rather, the MDFS may interact with appropriate the DSFS for the requested operation on behalf of the client. An example of such protocols are NAS (network attached storage) protocols which are not aware of any distinction between MDFS and DSFS and expect to access the metadata and file content data at a single network location or file server, which typically is that of the MDFS. One way to provide for that is for the MDFS to undertake the responsibility for forwarding READ and WRITE request to the appropriate DSFS. Thus, even though the protocol definition such as for NAS may not be aware of the MDFS/DSFS distinction, the implementations of that protocol still can be aware of it, to great benefit. Thus, MDFS or other software module(s) with which the MDFS communicates may handle the routing and communications to obtain the requested data based on the layout information for those clients which do not utilize layout data and do not directly communicate with the DSFSs.

In accordance with techniques herein for file system quota management, consider a further illustration in connection with the foregoing of FIG. 3. Assume that client 220 is user1 designated as owner of FILE1 having layout information and portions of the file data stored as described above and illustrated in FIG. 3. A quota may be specified indicating an upper bound or limit on storage allocated for files, directories, and the like, owned by user1 across the entire namespace of the distributed file system. Such a portion of files, directories, and the like, for user 1 may be characterized as a quota set to which the quota is applied. Files for user1 may have data located on any of the DSFSs 206a-206c. Thus, each of the foregoing DSFSs may be a storage allocator whereby each such storage allocator makes allocations for user1 subject to the quota limit specified for user1. For this example, assume a quota of 80 KB is specified for user1. Although as will be appreciated by those of ordinary skill in the art that although such an amount of 80 KB may not be of the scale of storage limits that would be actually utilized, any amount may be specified for purposes of illustration of techniques herein. The MDFS may function as the quota coordinator that communicates with each of the allocators in connection with techniques herein. The MDFS may handle partitioning all, or less than all, of the quota for user 1 among the allocators, which are DSFSs 206a-c in this example. MDFS may partition 60 KB of the possible 80 KB quota equally among the 3 DSFSs 206a-206c and retain the remaining 20 KB as free space of a free pool. Thus, each DSFS may have a bound (B) or limit of 20 KB regarding the amount of storage that may be allocated for user 1. It should be noted that this bound B for a DSFS allows a DSFS to independently determine and thereby grant a request for a write operation to proceed (e.g., the DSFS can determine independently that granting such a user's request would not cause the user's quota to be exceeded). However, use of such a bound B by a DSFS does not provide sufficient information for a DSFS to independently determine that a write cannot be performed when granting such a request would exceed the user's quota. As described herein, making such a determination as to whether a write can be granted without exceeding the user's quota requires use of additional information beyond that of a single DSFS's value for B representing a portion of the user's total quota. Each DSFS may perform processing independent of the other DSFSs to grant a request for additional storage for user 1 up to its bound B in connection with enforcing its bound or portion of the quota for user1, The amount of storage represented by bound B for a DSFS may generally comprise two portions at any point in time—a first portion A representing an amount of storage that is actually allocated or consumed and a second remaining portion R representing a reserved amount (e.g., buffer) of available additional storage provisionally or temporarily granted to the DSFS for use servicing storage requests for the quota set. As described in more detail below, the reserved amount of storage R may be recalled or retracted, in whole or in part, by the coordinator at any point in time (provided that the DSFS has not yet actually utilized any portion of R since provisionally granted by the coordinator. This is described in more detail below). Each DSFS may track and locally store its corresponding A and R values for user1. The MDFS may track the quota limit of 80 KB specified for user 1 and also values of B, R and A for each DSFS. It should be noted that the information for B, R and A as maintained on the MDFS may not always be up to date depending on the last time the MDFS had its information updated via communications with each of the DSFSs. In this example, assume that data portions of FILE 1 denoted by 240a (on DSFS 206a), 240c (on DSFS 206b) and 240d (on DSFS 206c) currently have storage allocated at a first point in time and that there is currently no storage allocated in connection with the data portion 240b of FILE 1. At a second later point in time, the client 220 for user1 may issue a request to write data to FILE 1 to the data portion 240b thereby resulting in allocation of storage for the data portion 240b.

Referring to FIG. 4, shown is an example illustrating information as may be maintained on the MDFS and each of the DSFSs 206a-c at a first point in time prior to the client issuing the above-mentioned write request for FILE 1 for use in connection with techniques herein. The MDFS at the first point in time prior to the above-mentioned write operation may maintain information of 260. Element 270 includes information regarding portions of the user1 quota of 80 KB as partitioned among the three DSFSs. The MDFS may maintain information for each DSFS as represented by an associated row of 270. For example, the MDFS may maintain information for DSFS A 206a illustrated in 272, for DSFS B 206b illustrated in 274, for DSFS C 206c illustrated in 276.

Additionally, each DSFS may maintain its own local copy of its own information. For example, DSFS A 206a may maintain information as illustrated in 282, DSFS B 206b may maintain information as illustrated in 284, and DSFS C 206c may maintain information as illustrated in 286. As described elsewhere herein, information maintained by each DSFS may be more up to date at any point in time than the information maintained for each DSFS by the MDFS depending, for example, on allocations made by the DSFS since it last notified the MDFS regarding how much of its bound B is actually allocated or consumed.

Figure 5:
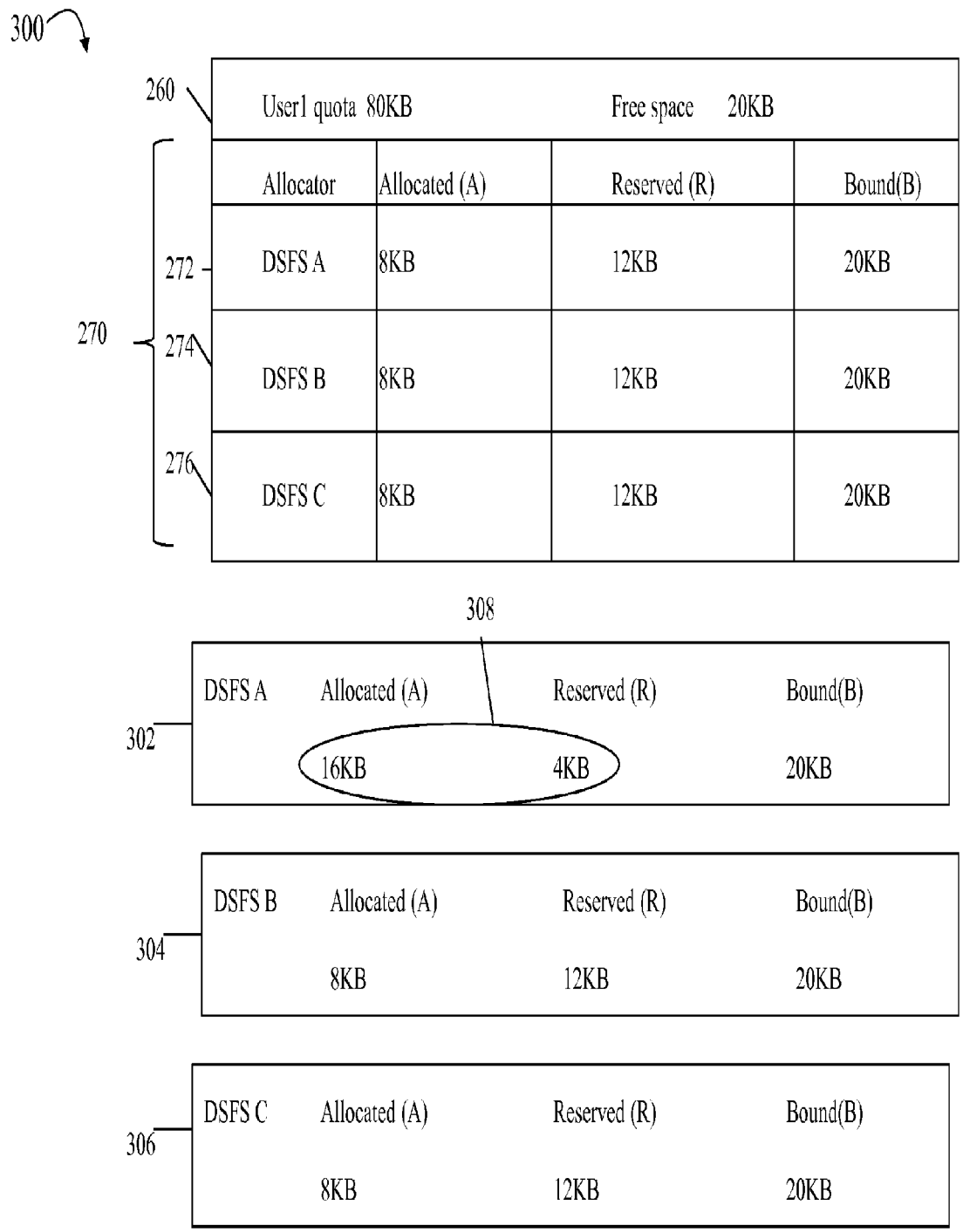

At the second point in time with reference to FIG. 3, client 220 issues a request to write data to FILE 1 at portion 240b and sends the request directly to DSFS 206a. In connection with techniques herein, DSFS 206a determines that the request requires allocation of 8 KB of storage and performs processing to determine whether it can grant the request. Using its information as illustrated in 282 of FIG. 4, DSFS 206a determines that it has 12 KB of reserved or available storage to service allocation requests for user and thereby grants the request by allocating the 8 KB of storage from user 1's quota and performing the write operation. After performing the write operation, the information as maintained by each DSFS and the MDFS is as illustrated in connection with FIG. 5. It should be noted that DSFS A 206a has updated amounts as represented by 308 in connection with allocating the requested storage in accordance with the quota for user1 and the portion thereof distributed to the allocator DSFS A 206a (e.g., Bound B=20 KB) as provided by the coordinator.

Figure 6:
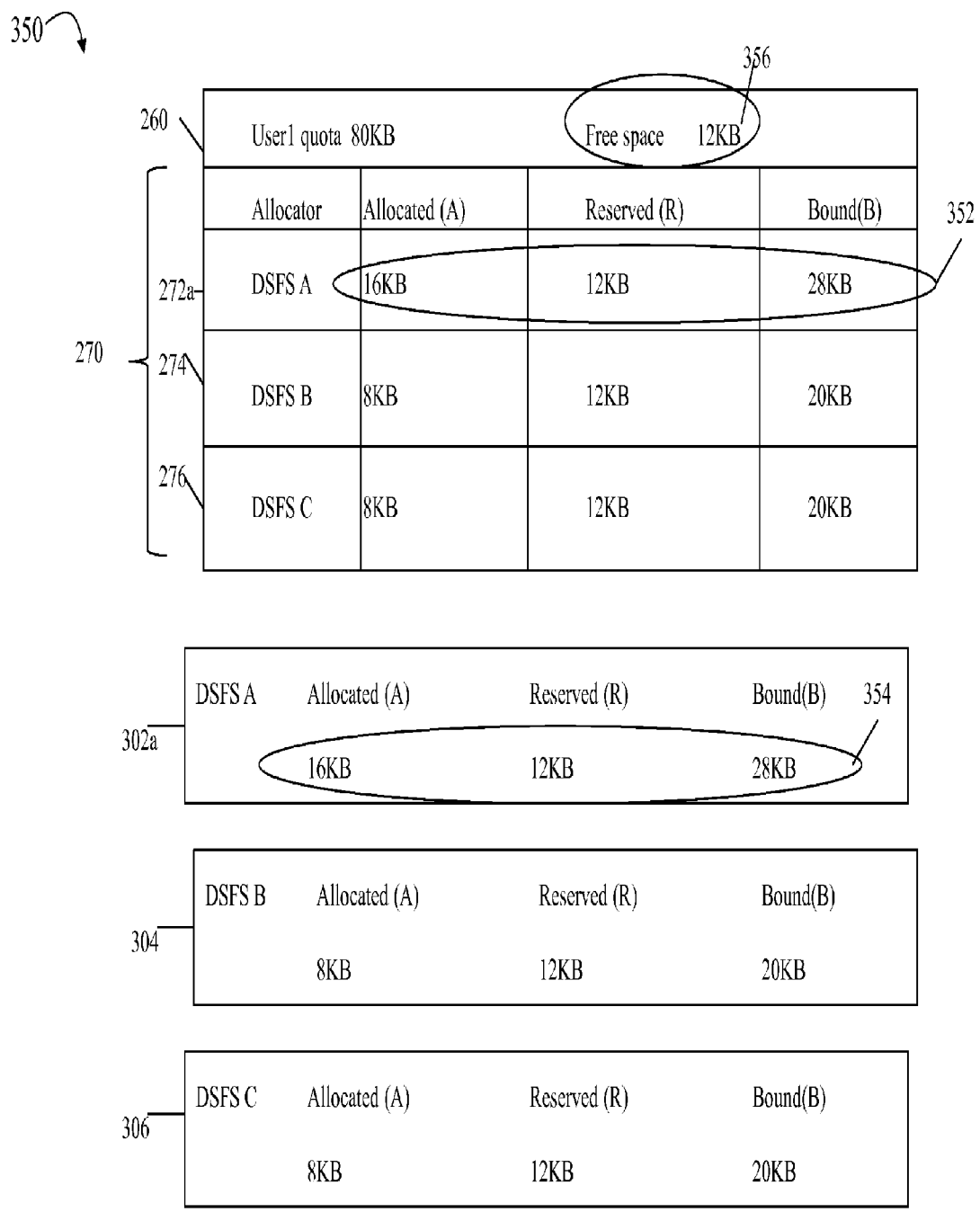

Each DSFS may also perform processing to monitor its current amount of allocated storage A for its given portion B of user1's quota as distributed to the DSFS. For example, assume that each of the DSFSs 206a-206c monitors its current allocation A of user1's storage quota and, upon the current allocation A for the particular DSFS being within 5 KB of the bound B=20 KB, the DSFS requests additional storage from user1's quota from the MDFS by issuing a reservation request to the MDFS. In this case, DSFS A 206a determines that its reserved amount is within the threshold amount of 5 KB of its bounded portion B of the quota for user1 (e.g., its allocated amount A=16 KB is greater than 15 KB) and DSFS A 206a issues a reservation request to the MDFS for additional storage. In connection with this reservation request, DSFS A 206a may transmit its current allocation amount A of 16 KB to the MDFS. The MDFS may then update its information of 272 to reflect the updated allocation amount of 16 KB for DSFS A 206a. MDFS determines whether it can grant the reservation request by first examining the amount of free space for user1 which is 20 KB. In connection with the reservation request, MDFS determines that it can grant the reservation request from DSFS A and may increase DSFS A's bound B to 28 KB (e.g., thereby providing for an 8 KB increase for DSFS A to restore DSFS A's reserved amount R to 12 KB). MDFS may send a response to DSFS A indicating the foregoing. As a result, with reference now to FIG. 6, information as maintained on the DSFS A may be updated to that as indicated by 354. Additionally, information represented by 352 and 356 as maintained on the MDFS may be accordingly updated to reflect the granting of the reservation request to DSFS A.

Figure 7:
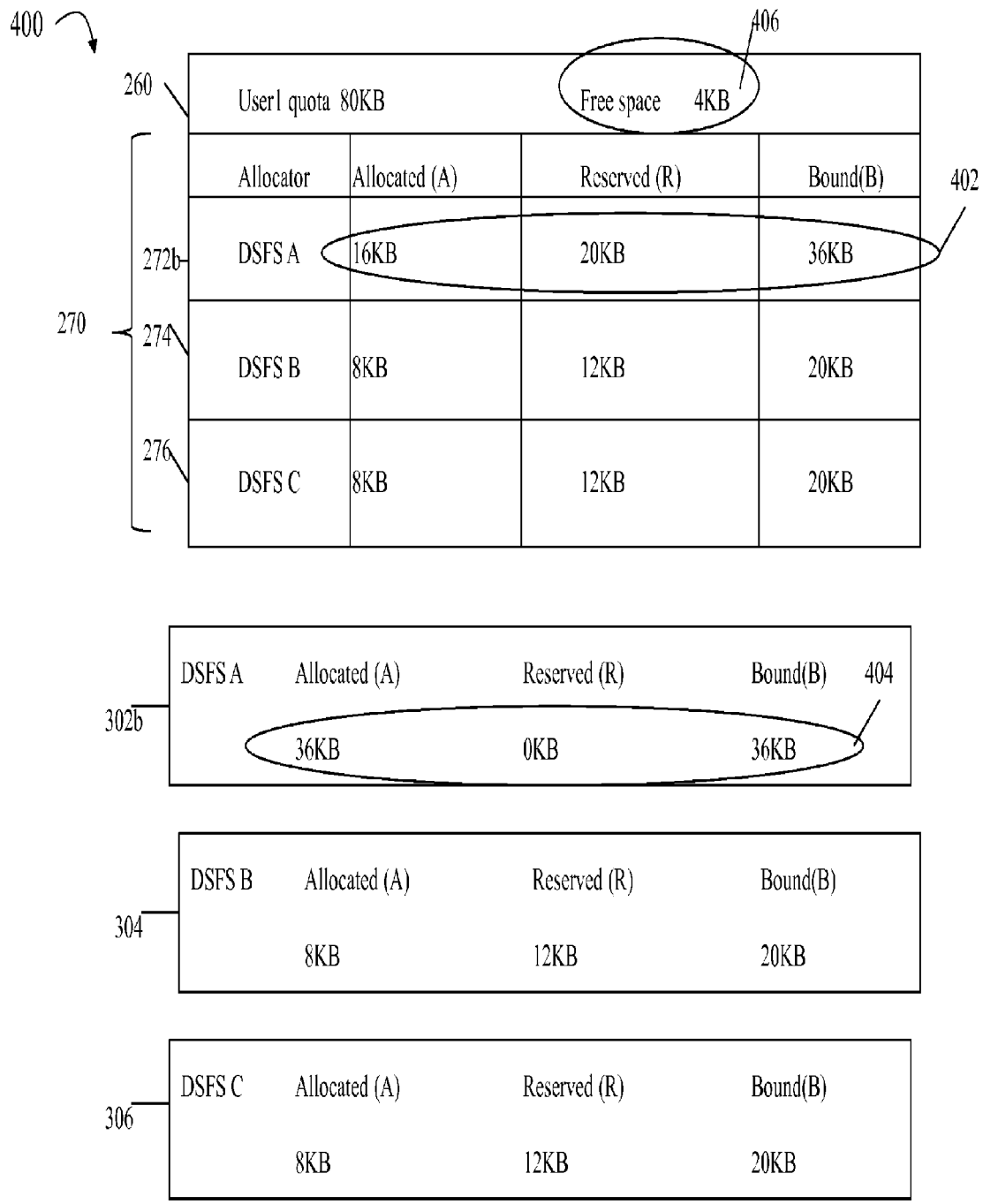

At a third point in time, let the client A for user1 now issue another second write request to DSFS A 206*a* for file1 or even another file for which user 1 is the designated owner thereby affecting current storage allocations collectively bounded by user1's quota of 80 KB. In any case, this second write request may be to write 20 KB of data. In order for DSFS A 206*a* to perform the request, DSFS A must allocate an additional 20 KB of storage for user1's write operation. With reference to 302*a* of FIG. 6, DSFS A examines its reserved amount R and determines it only has 12 KB of reserved storage available and cannot therefore grant the allocation request for 20 KB of storage. DSFS A then issues a reservation request to MDFS for more storage and includes in the request its current allocation amount A of 16 KB. MDFS proceeds in a manner similar to that as described above and determines it has 12 KB of free space. In connection with the reservation request, MDFS determines that it can grant the reservation request for DSFS A and may increase DSFS A's bound B by another 8 KB thereby making B=36 KB for DSFS A. MDFS may send a response to DSFS A indicating the foregoing. DSFS A now has reserved space of 20 KB and can perform the allocation of 20 KB for the write for user 1. After this allocation by DSFS A, information as maintained by the DSFSs and MDFS may be as illustrated in FIG. 7. Elements 402 and 406 indicate information updated on the MDFS and element 404 indicates information as updated on DSFS A.

At a fourth point in time, the MDFS may determine that its amount of free space denoted as 4 KB in 356 has become too low such as less than the amount of reserved space maintained according to its information of 12 KB for each DSFS. As such, the MDFS may perform processing in an attempt to recall some or all of the reserved storage from one or more of the DSFSs in order to increase its free space. In connection with this, MDFS may also adjust the reservation amounts for each of the DSFSs based on recent activities for reservation requests. Based on DSFS A's history of reservation requests and DSFS B and C's lack of reservation requests, MDFS may determine that there is a larger load of write requests to DSFS A relative to those in connection with DSFS B and C. As such, MDFS may decide to vary the reservation amounts for DSFA to be much larger than that for DSFS B and DSFS C. For example, MDFS may decide to maintain the 20 KB reservation amount for DSFS A and adjust the reservation amount to 3 KB for each of DSFS B and DSFS C. To this end, MDFS may issue a request to each of DSFS B and DSFS C to recall 9 KB of their respective reservations thereby making the bound B=11 KB for each of DSFS B and DSFS C. In connection with the request to recall each reservation from DSFS B and DSFS C, the MDFS may send to each DSFS the revised and reduced B value of 11 KB. In response, DSFS B may return its current allocation amount of 8 KB and DSFS C may also return its current allocation amount of 8 KB to the MDFS. MDFS may not issue a reservation recall request to DSFS A in this example based on the revised R amount determined for DSFS A in accordance with DSFS A's currently observed allocation (e.g., write) load.

Figure 8:
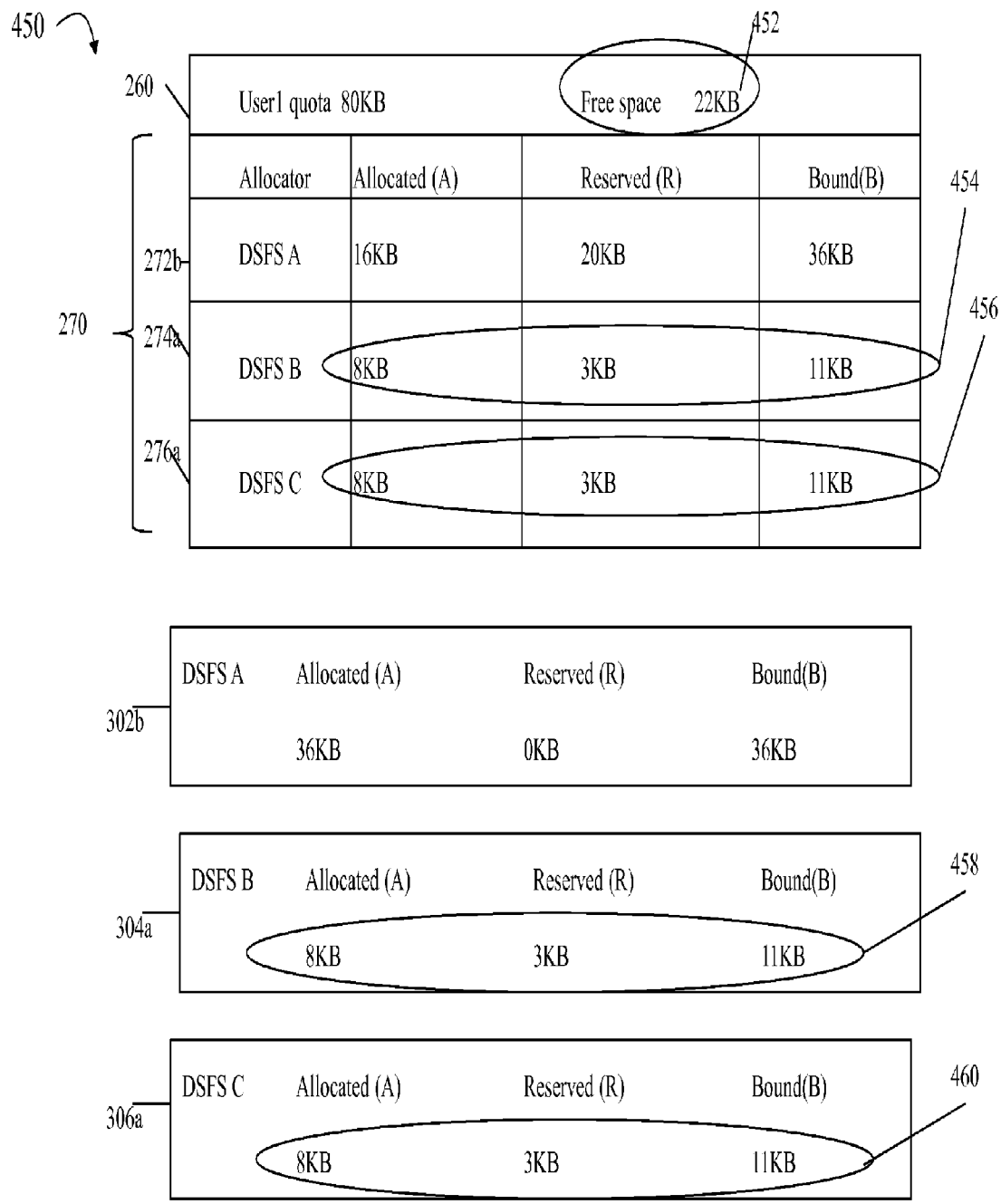

After this reservation recall by the MDFS, information as maintained by the DSFSs and MDFS may be as illustrated in FIG. 8. Elements 452, 454 and 456 indicate information updated on the MDFS, element 458 indicates information as updated on DSFS B, and element 608 indicates information as updated on DSFS C.

At a fifth point in time, DSFS A may determine that it has insufficient reserved amount=0 and may issue another reservation request to MDFS for more reserved storage. In this request, DSFS A reports its allocated amount of 36 KB. MDFS accordingly updates its information and determines that it can grant additional storage to DSFS A. MDFS may desire to maintain a reservation value R of 20 KB for DSFS A due to its history of reservation requests and increases B to DSFS A to 56 KB (e.g., increased by 20 KB to maintain a reservation amount of 20 KB based on current allocation of 36 KB). MDFS may send a response to DSFS A indicating this revised B value of 56 KB. After DSFS A receives the response with the revised 56 KB, it updates its local information.

Figure 9:
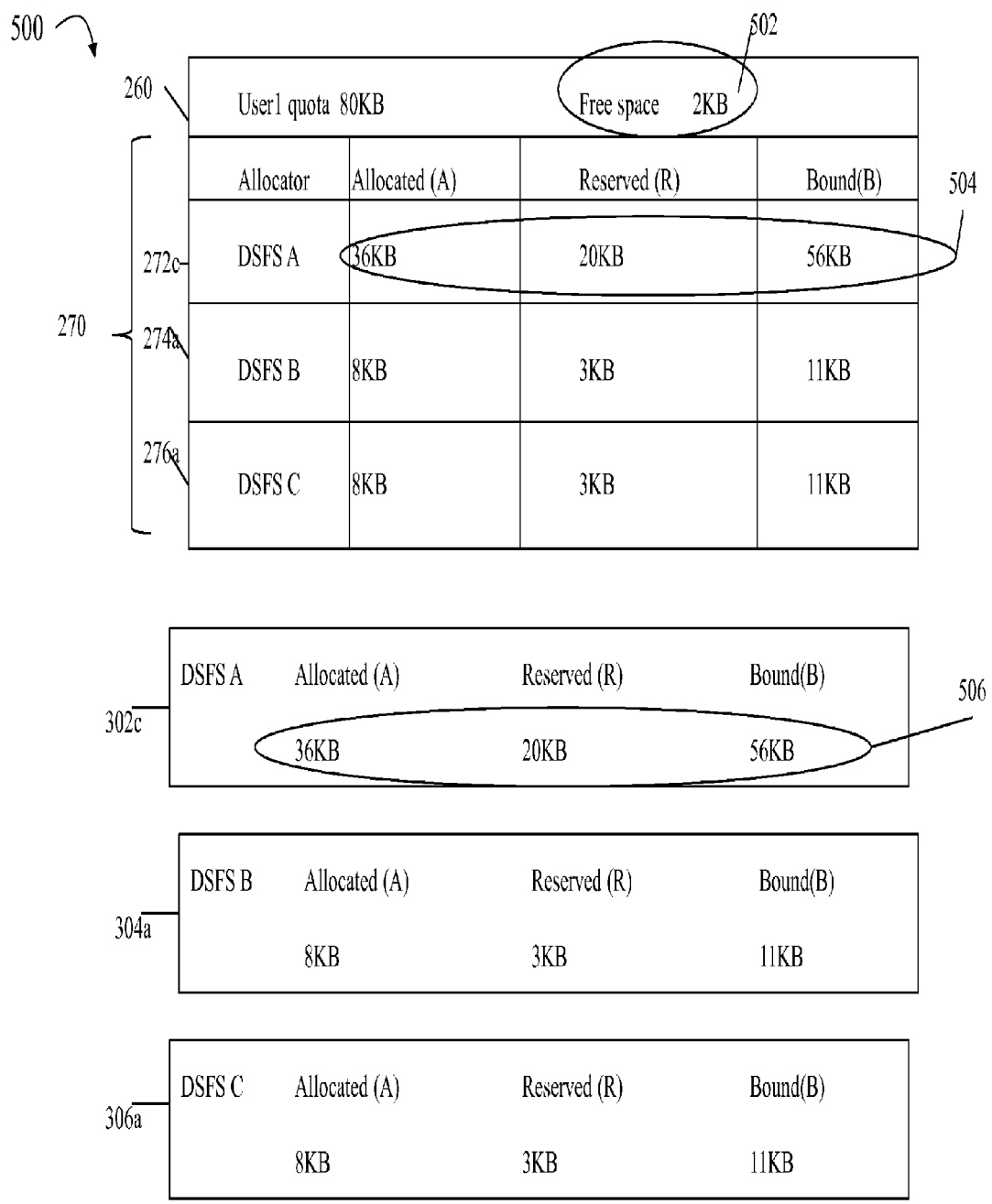

Information as maintained by the DSFSs and MDFS at this point may be as illustrated in FIG. 9. Elements 502 and 504 indicate information updated on the MDFS, and element 506 indicates information as updated on DSFS A.

At a sixth point in time assuming the state of information as in FIG. 9, the client 220 may perform an operation to delete one or more files of user1 whereby such files which are deleted are all stored on DSFS A and have a total size of 30 KB. This deletion of 30 KB of data for user 1 results in a decrease of 30 KB in the amount of allocated storage for user 1 overall and also reducing the allocated storage for user 1 on DSFS A to 6 KB and increasing the reserved amount to 50 KB on DSFS A. Accordingly, DSFS A may send a message to the MDFS with this revised allocation amount of 6 KB. MDFS may receive this and send a response indicating that DSFS A's B value has been lowered to 26 KB thereby also reducing DSFS A's R value to 20 KB.

Figure 10:
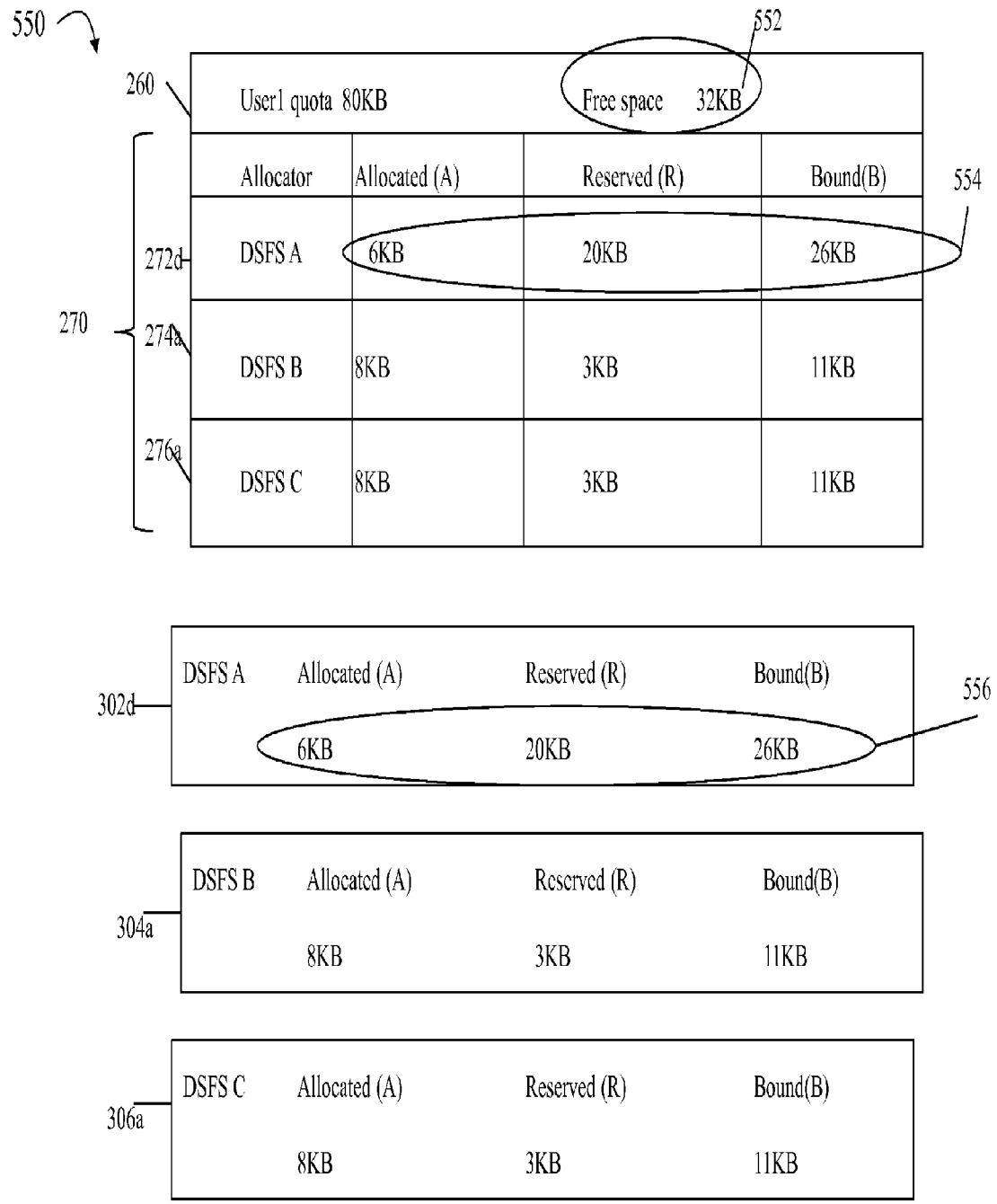

At this point, information of FIG. 9 as maintained at both the MDFS and on DSFS A may be as illustrated in FIG. 10, Elements 552 and 554 indicate information updated on the MDFS, and element 556 indicates information as updated on DSFS A.

It should be noted that embodiments may adopt policies that limit or delay the occasions on which a DSFS notifies the MDFS regarding a reduction in allocated storage at that DSFS (e.g., due to truncate, delete, or remove operations). For example, an embodiment might perform such notification if and only if such a reduction is more than a threshold amount. Otherwise, in the example embodiment, the DSFS would not notify the MDFS of the reduction in allocated amount.

Figure 11:
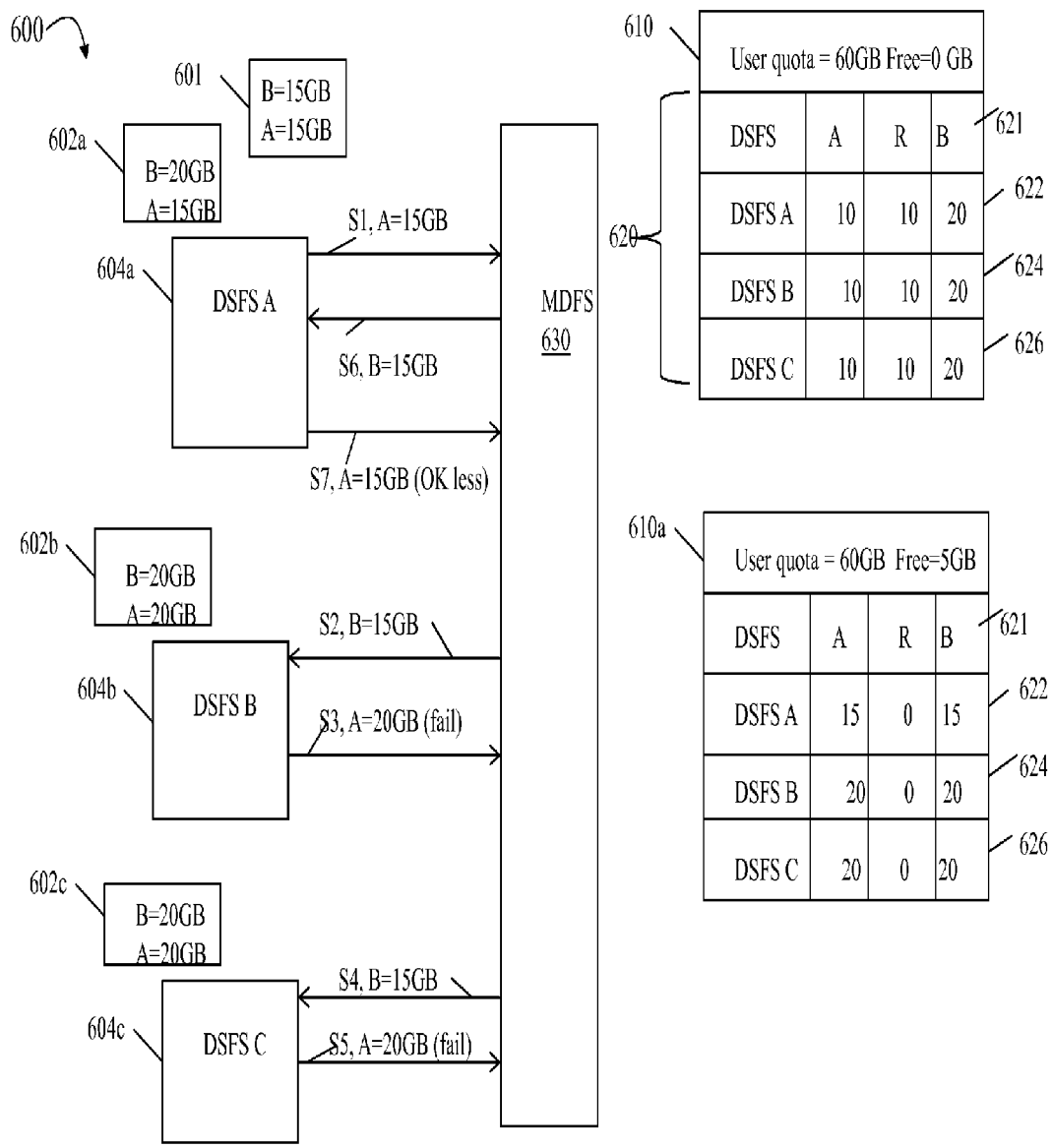
FIG. 11 is another example illustrating messages exchanged between various components of the distributed file system and information used by the components for quota management in an embodiment in accordance with techniques herein.

Referring to FIG. 11, what will be described is another example to illustrate additional aspects in connection with a reservation recall as may be performed by the MDFS. The example 600 includes an MDFS 630 as coordinator and DSFSs 604*a-c* as allocators. Element 610 represents information as known by the MDFS at a first point in time. Note that in comparison to examples described above, the user's quota is now increased as illustrated in FIG. 11 and described below. Element 602*a* represents information as maintained locally by DSFS 604*a* at the first point in time. Element 602*b* represents information as maintained locally by DSFS 604*b* at the first point in time. Element 602*c* represents information as maintained locally by DSFS 604*c* at the first point in time. In 610, the quota 60 GB may be specified for files having a particular owner="user". Element 620 includes information similar to that as described in connection with element 270 of FIG. 10 where the column of 621 denoted as DSFS denotes one of the DSFSs 604*a-c*, the column of 621 denoted as "B" represents the bound or upper limit of the user quota partitioned or distributed to a DSFS, and the column of 621 denoted as "A" represents the amount of currently allocated storage with respect to the user quota. Each row of 620 includes a set of the foregoing values for B, A and R for one of the DSFSs. Elements 602a-c, respectively, represent information maintained or stored locally on the DSFSs 604a-c in a manner to that as described elsewhere herein in connection with other examples. In 602a, the value denoted as "B" represents the bound or upper limit of the user quota partitioned or distributed to DSFS A 604a and the value "A" represents the amount of currently allocated storage with respect to the user quota on DSFS A. In a similar manner, 602b includes the current quota information for DSFS B 604b and 602c includes the current quota information for DSFS C 604c. It should be noted that the information as maintained in 620 and each of 602a-602c may differ due to the DSFSs performing allocations within the specified bounds B after allocations have been reported to the MDFS as represented in 620.

At the first point in time, DSFS A 604a sends a reservation request S1 to MDFS 630 indicating its current allocation A of 15 GB. Such a request may be sent, for example, if DSFS A 604a determines its amount of reserved space (where R=B−A) is less than some desired amount or threshold. MDFS 630 receives the request and determines that it has no storage in the free pool for the user with the quota of 60 GB. As indicated in 620, the 60 GB is currently all equally partitioned among the 3 DSFSs 604a-604c. Subsequently, the MDFS may perform processing to attempt reservation recalls from DSFS 604b-c. In connection with attempting a first reservation recall, MDFS sends S2 a message to DSFS B 604b requesting that DSFS B 604b reduce its B value to from 20 GB to 15 GB. DSFS B 406b responds by sending a message S3 indicating that its current allocation A is 20 GB and it cannot lower its bound B to 15 GB as requested. Thus, the reservation recall to 604b has failed to reclaim any reserved storage. In connection with attempting a second reservation recall, MDFS sends S4 a message to DSFS C 604C requesting that DSFS C 604C reduce its B value to from 20 GB to 15 GB. DSFS C 406c responds by sending a message S5 indicating that its current allocation A is 20 GB and it cannot lower its bound B to 15 GB as requested. Thus, the reservation recall to 604c has also failed to reclaim any reserved storage. MDFS may also determine that, based on the updated allocation amounts received from the DSFSs, there is only 5 GB of unallocated storage and wants to further reduce the B value for DSFS A 604a to 15 GB and keep the 5 GB in free storage for whichever DSFS may require the remaining 5 GB amount of storage. As such, MDFS sends S6 a message to DSFS A 604a indicating that, although it has requested additional storage as a reservation and currently has a B value of 20 GB, MDFS is further lowering its B value to 15 GB. In response, DSFS A 604a sends a message indicating that its current allocation is 15 GB and it has updated its B value to the requested 15 GB limit.

In connection with the foregoing, the example illustrates a reservation recall failure which does not recall any reserved storage from DSFS B 604b and DSFS C 604c since each had already utilized their respective R amounts. However, for example, if DSFS B 604b had not completely used it R amount (e.g., whereby A did not equal B for DSFS B in information maintained at DSFS B), then the coordinator MDFS 630 would have recalled any unallocated reserved amount indicated by such an R value for DSFS B, when R>0.

Element 610a represents an updated version of 610 as updated by the MDFS based on the above-mentioned exchanges between the MDFS and the DSFSs 604a-604c. Such exchanges result in information communicated from the DSFSs to the MDFS with revised values as maintained on the MDFS used for quota management techniques herein.

It should be noted that that the messages exchanged between the components 604a-c and 630 may be performed asynchronously. Additionally, although the above examples illustrate performing quota management in connection with per user quotas for file system entities for each user, quotas may similarly be specified for other portions of the distributed file system and associated namespace such as, for example, using per-directory quotas or quotas per quota tree. A directory and all its subdirectories, if any, may be considered as a tree (e.g., subtree of an entire file system name space) that is subject to a tree quota. Thus, a quota may be specified as a limit for storage allocated for the entire tree. As will be appreciated by those skilled in the art, the techniques herein may be used in connection with implementing and enforcing additional types of quotas or limits (e.g., such as based on defined groups of users) as may be included in an embodiment. It should be noted that the techniques herein may be used to implement one or more such different types of quotas simultaneously as may be specified in an embodiment. This is further described elsewhere herein.

The foregoing examples illustrate processing as may be performed by the MDFS and DSFSs (or more generally coordinator and allocators) in an embodiment in accordance with techniques herein with performing quota management. Client requests may be received at the DSFSs which are free to allocate storage amounts partitioned in accordance with their respective bounded limits or B values as determined by the coordinator. At some point, the DSFS may allocate storage for a particular quota set such as related to storage for a particular user and the total allocated amount A by the DSFS is within some threshold amount of the DSFS's B limit. At this point, the DSFS may request an additional reservation amount from the MDFS/coordinator.

When the DSFS receives the client write request requiring additional storage allocation to service the request, the DSFS can either 1) grant the request (if the DSFS determines that the request can be granted using the DSFSs reserve storage without exceeding its B limit) OR 2) delay the request if the DSFS currently does not have sufficient storage to allocate with the existing reservation. If delayed, the DSFS may request additional storage from the MDFS by issuing a reservation request to the MDFS. The MDFS may then GRANT the request if there is free space available in the particular user quota. Otherwise, the MDFS may proceed with attempts to recall reservations from other DSFSs in order to grant the reservation request for the DSFS. Thus, in one aspect the reservation may be characterized as provisional or temporary grant of storage for a particular quota by the MDFS (as coordinator) to a DSFS (as an allocator). Reserved storage, at a point in time subsequent to being granted to an allocator, may or may not be consumed or allocated by an allocator. A reservation grant made by a coordinator to an allocator may be fully recallable or retracted by the coordinator, may be partially recallable by the coordinator, or may not be recallable at all, depending on whether the allocator has consumed, respectively, none of, a portion of, or all of a reservation.

As described herein, a quota set may be a set of files (possibly including directories) to which a user quota applies. A quota tree may be characterized as another quota set including files which correspond to a portion of the entire federated distributed files system namespace having a tree structure whereby the quota tree may be represented as a subtree of the foregoing tree structure for the entire namespace. A quota tree limit is the quota or limit specified for such a quota tree that may include a particular directory and its subdirectories, if any (e.g., a subtree) whereby the quota tree limit is applied in total to the collective consumption of storage in the quota tree by all users. Generally, a file may belong to one or more quota sets. Two quota sets may be, for example, the set of files based on user ownership and a second set of files based on the tree or subtree in which the file is included. Each quota set (such as for each user's files based on which user is the owner) may have its own quota. For example, user quotas may be specified whereby all files having user X as owner are subject to a first quota specified for user X, files having user Y as owner are subject to a second quota specified for user Y. The quotas may be more generally applied to any quota set (e.g., per group of users, per directory). Other variations and combinations are possible. For example, a quota set may be determined and subject to multiple quota limits at the same time so that user quotas and/or group quotas are applied within a particular quota tree that is a portion of the entire file system namespace.

The techniques herein make no assumption about how storage space consumption is determined within the framework of a single DSFS and the techniques herein may be used with any suitable determination. For example, in connection with a system that utilizes data deduplication techniques and a same single block is stored in two files subject to two different user quotas for two different users, there are a number of ways in which the storage space consumption of each user may be affected. An embodiment may, for example, charge the same block to both users' quotas even though the system may actually store only a single physical copy of the block data, divide the storage charge among the users, or any other suitable storage policy to determine consumption in connection with techniques herein.

Each DSFS has an independent quota mechanism that tracks how much of each active quota set is used within that DSFS (e.g., as indicated by locally tracked A values described herein). Each DSFS may store such information persistently so as to be available upon the DSFS failure and subsequent restart. Each DSFS obtains and maintains information on quota trees to which the files it is storing belong. For example, when creating DSFS objects such as files or directories, a quota-tree id denoting the particular quota tree to which the objects belong may be passed as part of the create request. Each DSFS has the ability to enforce quotas by checking allocations against bounds (e.g. B values) obtained from a coordinating component. As described elsewhere herein in more detail, each DSFS may check its current allocation against a special send limit (e.g., within a specified threshold less than the maximum allowable bound or limit B where such threshold may be independently and suitably determined for each DSFS) and provide for scheduling an asynchronous transfer to update such maximum allowable bound or limit in response to reaching the special send limit. Each DSFS may also perform processing to determine whether an allocation request received at the DSFS may be allowed (e.g., the DSFS may check the amount of storage requested against its currently unallocated reserved storage to see if there is sufficient storage to service the request). If not, the DSFS may perform processing to determine if an allocation request can be granted via communicating with the coordinator such as the MDFS. If there is a pending reservation request for additional reserved storage (e.g., DSFS has issued the request and the MDFS or other coordinator has not responded), the client allocation request may be delayed until the reservation request is either granted or denied. The DSFS may also issue an RPC (remote procedure call) to the coordinator to determine if an allocations request can be granted and respond appropriately based on the coordinator's response. This may be performed as a more direct way of determining whether a client allocation request may be serviced (e.g., is there sufficient unallocated storage to grant the allocation request and abide by quota limits), for example, if the coordinator has not yet granted a reservation request for additional storage. An RPC, such as the ALLOC_CHECK RPC, is described elsewhere herein in more detail and may be included in an embodiment in accordance with techniques herein. It may be assumed that the allocator utilizing ALLOC_CHECK will immediately use any additional storage granted to serve an outstanding allocation request rather than simply increase its reservation. In other words, the trigger event causing the allocation to invoke ALLOC_CHECK may be in response to an allocation request and the allocator does not currently have sufficient reserved storage to service the allocation request.

As illustrated in connection with the foregoing examples and descriptions, there may be a quota coordinator and one or more quota allocators. The coordinator may be characterized as an entity performing processing and tracking information in connection with coordinating the separate allocations made by the various quota allocators of storage. Allocators are generally those components making storage allocations within quota limits referring resolution of possible conflicts to the quota coordinator as may be needed. In some embodiments described herein, the MDFS may assume the role as coordinator and each DSFS may be an allocator although a separate component which is neither the MDFS or DSFS may function as the coordinator. Additionally, the MDFS may function as both a coordinator and an allocator depending on what particular operations incur quota charges. For example, if there is a quota charge for space utilized by symbolic links, directories, storing small files, and the like, then MDFS may function as an allocator if such operations performed by MDFS consume storage space accounted for against various quotas. Additionally, it should be noted that although DSFSs are described herein as allocators, an embodiment may include other components which also function as an allocator or consumer of storage charged against file system quotas.

MDFS, as coordinator, has knowledge regarding the quotas and, for all DSFSs, allocations and reservations for such DSFSs. The allocations known by the MDFS as coordinator may or may not be current in representing the actual allocations by each DSFS at a current point in time. For example, as illustrated in connection with FIG. 11, MDFS may have a current allocation for a DSFS reported at a first point in time and the DSFS may have a reservation for additional storage. At a later point in time, the DSFS may allocate additional storage from its reservation thereby updating its allocation. However, such updated allocation value may not be known to the MDFS. Thus, the allocations stored on the MDFS at a point in time may or may not represent the current most up-to-date allocations for the DSFSs depending on what additional allocations, if any, the DSFSs have made from their respective reservations since last reporting allocations to the MDFS.

Concepts regarding allocations, reservations, and the like, are described in connection with the foregoing examples. What will now be set forth is a more formal and general description of such concepts and terms that may be used in connection with techniques herein for quota management. In the following description, reference is made to a single quota as described above although the techniques herein may be used in connection with multiple quota limits and multiple quota sets. The following conventions may be used:

n is the count of FS (file system) components taking the allocator role.

Specific allocators are denoted by $i, j, k \ldots$.

Individual Quota Sets are denoted by $X, Y, Z \ldots$.

Assume reference to a single quota set. Note that when it becomes necessary to distinguish values by quota set and there may be multiple such quota sets, the specific set will appear in brackets (e.g., quota set [X]). Values that may be utilized in an embodiment herein may be generally classified into four classes: global values which are known accurately by the coordinator, values inherently local to specific allocators, global values that the coordinator maintains in order to control and limit quota allocation by the allocators, and reservation control values managed jointly by the coordinator and specific allocators.

In connection with the foregoing, the first class of values may include L which is the allocation limit for a quota set. It is assumed that the quota coordinator is the one who knows what this value is and that other components make no reference to it.

In connection with the second class noted above, each quota allocating component i, has a corresponding $A_i$, (e.g., also described above as "A" values) which denotes how much space associated with the quota is actually allocated by FS component i. This value is known to the allocator and may be communicated from time to time to the coordinator. As a result, the coordinator's knowledge cannot be assumed to accurate. In connection with techniques herein, it needs to be ensured that $$\sum_{i<n} A_i <= L.$$

In connection with values of the second class noted above for each quota allocating component i, there is a corresponding $R_i$, (e.g., also referred to as "R" values above) which denotes how much reserved space associated with the quota was assigned to FS component i by the quota coordinator. The coordinator tries to decide on and manage this value but the value known by the allocator and used to control allocation resides on the allocator. We need to ensure that $$\sum_{i<n} (A_i + R_i) <= L.$$

Each quota allocating component i, picks an $S_i <= A_i + R_i$, which denotes the point (or special limit in terms of a value of $A_i$) at which the allocating component is to send allocation information to the allocation coordinator and request additional reserved storage. The intent is that this is done after using some of the existing reservation but soon enough so that the coordinator's response arrives in sufficient time to provide adequate additional reservation for the allocator. This is to avoid having the allocator wait to grant an allocation request due to waiting for the coordinator to grant an additional reservation request. The value $S_i$ may be determined suitable by each allocator and typically not known to the coordinator, although the coordinator may have reasonable expectations as to its value.

In connection with the third class of values related to global values for quota and reservation management noted above, the coordinator is the one charged with maintaining a global view of quotas and allocations. Because many activities are going on without its knowledge (which is good thing from a performance point of view), its knowledge is necessarily imperfect. However, it must manage things so that it can meet quota goals. In connection with the third class of values, we define the following globals per-Quota-Set, some of which the coordinator maintains and some of which are abstractions:

A<sub>CUR</sub> is defined as $$\sum_{i<n} A_i.$$

Clearly, for the algorithm to work, A<sub>CUR</sub><=L.

Note that, given ongoing allocation and deallocation activities happening at the allocator components, the coordinator does not know what this value actually is, although there are ways that it can bound the value.

A<sub>LIMIT</sub> is defined as $$\sum_{i<n} (A_i + R_i).$$

It is the coordinator's job to keep A<sub>LIMIT</sub> (and thus A<sub>CUR</sub> as well) below L.

A<sub>KNOWN</sub> is defined as the sum of the last $A_i$ values received by the coordinator from each component.

What will now be described are values of the fourth class of values noted above for reservation management. Reservations are a way for the coordinator to bestow on an allocator the right to allocate some amount of storage for a given quota set with the assurance that the allocator, in doing so, will not cause the quota limit to be exceeded. Reservations are recallable, but the allocations made using them, are, once made, permanent unless and until such storage is otherwise deallocated (e.g., such as in connection with a delete, truncate or remove operation), which leads to the following for the coordinator:

The coordinator may need to recall an allocation previously given to an allocator.

The reservation being recalled may have been previously converted into an allocation, which is then not recallable, so that the allocator has nothing to give back or in any case not what the coordinator recalled. Examples of this are described elsewhere herein.

As a result and as illustrated in connection with examples described elsewhere herein, accounting for reserved, allocated, and free space may be complex in that different components may have different levels of knowledge. Each allocator may have some amount of space reserved (or else there will be none which we treat as the limiting case of zero reservation). The reservation is denoted by $R_i$. Reservations are typically represented in terms of allocation bounds $B_i$ which combine the reserved and allocated amount together to establish a bound on what the allocator can allocate without the intervention of the coordinator. Free space may be represented as L-A<sub>LIMIT</sub>.

In connection with messages exchanges as illustrated in examples described above (e.g., S6 and S7 of FIG. 11), the coordinator may send a bound $B_i$ to an allocator requesting that the allocator use such a value as its limit or bound in connection with its local portion of a quota as partitioned by the coordinator. Under some circumstances, but not all, this will be an effective bound on $A_i$. It only becomes an effective bound when allocator responds with a current $A_i <= B_i$, (e.g., S7 of FIG. 11) confirming that there is now an effective reservation with $R_i = B_i - A_i$ and that $A_i$ cannot exceed $B_i$. until a new $B_i$ value is sent.

Examples above describe messages that may be exchanged between the coordinator and allocators. Following is a more detailed description of the intercomponent information flow of such exchanges.

A sequence of messages may be originated or initiated by an allocator or a coordinator and may provide for transfer of information. As a first case, consider the allocator-to-Coordinator Information Transfer where the allocator sends information to the coordinator. From time to time, as specified below, the allocator component i may send the following information to the coordinator for a given Quota Set X in a message:

An identifier for the Quota Set X.

A sequence number giving the ordinal position of this allocator-to-coordinator transfer among all those for this allocator component and Quota Set.

A sequence number giving the ordinal position of the last coordinator-to-allocator transfer received among all those for this allocator component and Quota Set.

Allocation information in the form the allocator current allocation count, $A_i[X]$.

An enumerated value indicating the reason for this message being sent where the enumerated value may denote one of the following predetermined items:

MoreNow indicating this is being sent because of an increase $A_i[X]$, typically because $A_i[X] >= S_i[X]$;

LessNow indicating this is being sent to advise the coordinator of a decrease in $A_i[X]$;

BackToYou if this is in response to a transfer initiated by the coordinator (with his enum being CoordStarted as described below); and OkLess if this is in response to a transfer response sent by the coordinator and having his enum NowLess.

A structure with the above-mentioned message information may be referred to below as an AllocSideXfr.

Consider now the Coordinator-to-Allocator Information Transfer originating from the coordinator. From time to time, sends the information to the allocator component i for a given Quota Set X:

An identifier for the Quota Set X.

A sequence number giving the ordinal position of this coordinator-to-allocator transfer among all those for this allocator component and Quota Set.

Reservation information in the form of an allocation bound for the allocator to use, $B_i[X]$. The value $B_i[X]$, equal to $A_i[X] + R_i[X]$, using the coordinator's current knowledge of A, is used as a way of communication a reservation to the allocator. The allocator determines $R_i[X]$ by computing $B_i[X] - A_i[X]$, using the allocator's current knowledge of A. An important point is that while the coordinator and allocator can disagree on $A_i[X]$ and $R_i[X]$, they will generally agree about $B_i[X]$, and that getting that consensus is trivial except in the case where $B_i[X]$ goes downward.

An enumerated value indicating the reason the message is being sent whereby the value may denote one of the following:

CoordStarted indicating that this is being sent by the coordinator and not in response to an allocator transfer. Such transfers should be responded to you by the allocator with enum BackToYou;

NowMore if this is in response to a transfer by the allocator and this $B_i[X]$ is greater than or equal to the last one sent; and LessNow if this is in response to a transfer by the allocator and this $B_i[X]$ is less than the last one sent.

A structure with the foregoing information may be referred to below as a CoordSideXfr.

In connection with message sequence or exchanges some of which are utilized in connection with examples herein, there may be basic information transfer interaction patterns. One embodiment may utilize three basic information patterns—two-way allocator-initiated, two-way coordinator-initiated, and three-way allocator-initiated.

For the two-way allocator-initiated information transfer set, the following pattern or message sequence may be utilized. First, the allocator sends its current allocation amount with the enum MoreNow (e.g., most common or typical) or LessNow. The coordinator responds with the new allocation bound and an enum NowMore. Note that if the enum were NowLess, this would be part of a three-way transfer. For the three-way allocator-initiated information transfer set, the following sequent or pattern may be utilized. First, the allocator sends its current allocation amount with the enum MoreNow or LessNow. Second, the coordinator responds with the new allocation bound and an enum NowLess. Third, the allocator sends its current allocation amount with the enum OkLess.

Following are tables summarizing the various transfer sets. In TABLE 1, Column 1 labeled START denotes the start condition or state, column 2 denotes the enumerated value as communicated in the first message of the exchange from the allocator to the coordinator, column 3 denotes the enumerated values as communicated in the second message of the exchange from the coordinator to the allocator, and column 4 denotes a brief description of the table row.

TABLE 1

Summary of Allocator-initiated Transfer Sets

| Start | A. Enum | C. Enum | Description |
|---|---|---|---|
| $A_i[X] >= S_i[X]$ | MoreNow | NowMore | The allocator has increased allocation enough to use up a significant portion of the reservation and the coordinator should try to give him more. The coordinator may not fully "top up" the reservation or even give the allocator more than it has now but at least it is not taking anything away. |
| | | NowLess | Allocator: Same as above The coordinator, because of conflicting use by other allocators, needs to reclaim some reservation previously given out. The allocator has to also respond with information on its current allocation before the coordinator can know what if anything has been reclaimed. This is an example of a 3-way message exchange or transfer. |

TABLE 1-continued

Summary of Allocator-initiated Transfer Sets

| Start | A. Enum | C. Enum | Description |
|---|---|---|---|
| $\Delta A_i[X] >= 0$ | MoreNow | NowMore NowLess | These cases are dealt with analogously to those in the cases above in which $S_i[X]$ is exceeded. The only difference is that the allocator's need for additional reservation is not pressing and it sent its transfer because enough time had gone by to make it worth updating the coordinator anyway. The coordinator will be less likely to make replenishment a priority but other things will be the same. |
| $\Delta A_i[X] < 0$ | LessNow | NowMore | The allocator has decreased allocation (due to REMOVEs or truncates) and wants to let the coordinator know what the new allocation situation is. Although this is unusual, If the amount freed is relatively small and the previous reservation was such that it needs to be increased, the coordinator might respond with MoreNow. |
|  |  | NowLess | Allocator: Same as above |

In TABLE 2, Column 1 labeled ENUMS denotes a first enumerated value/type communicated from the coordinator (Denoted C:) in the first message exchanged and a second enumerated value communicated from the allocator (denoted A:) in the second message of the exchange. Column 2 labeled START denotes the start condition or state at the prior to commencing the message exchange. Column 3 denotes the associated condition or state represented by the response back from the allocator to the coordinator, and column 4 denotes a brief description of the table row.

TABLE 2

Summary of Coordinator-initiated Transfer Sets

| Enums | Start | Back | Description |
|---|---|---|---|
| C: CoordStarted A: BacktoYou | $\Delta B_i[X] > 0$ | $B_i[X] > A_i[X]$ | The coordinator wants to increase the reservation for this allocator (unusual, since normally the allocator would ask first, but still possible). The allocator says, "Thanks". |
|  | $\Delta B_i[X] < 0$ | $B_i[X] > A_i[X]$ | The coordinator wants to reduce the reservation for this allocator Allocator indicates he has succeeded |
|  |  | $B_i[X] <= A_i[X]$ | The coordinator wants to reduce the reservation for this allocator The allocator indicates that the coordinator has failed and he has to accept allocation that has already been done. |
|  | $B_i[X] = 0$ No previous value | $A_i[X] >= 0$ | The coordinator isn't ready to establish a bound but just wants to determine the current allocation. The allocator responds with the current allocation. Any current bound is cancelled and the new bound is equal to the current allocation, until changed. |

Since the messages sent herein may be asynchronous and may be received in any order by the FS components, sequence numbers may be included in messages to provide for serialization of messages of different transfer sets which are associated with the same allocator i and quota set (e.g., user X's files). In other words, there may be serialization among transfer sets which are associated with the same allocator i and the same Quota Set. For each unique combination of allocator i and quota set, an embodiment may separately serialize all allocator-initiated transfer sets and all coordinator initiated transfer set. An allocator-initiated transfer set may be defined as the set of messages exchanged between components when the initial message is sent by an allocator. Similarly, a coordinator-initiated transfer set may be defined as the set of messages exchanged between components when the initial message in the set is sent by a coordinator. The foregoing form of serialization allows parallel transfers in some cases, where an allocator-initiated and a coordinator-initiated transfer may both send data at the same time in the same direction. As a first example, an initial transfer of an allocator-initiated transfer set and the response in a coordinator-initiated transfer set both go from allocator to coordinator and can happen at the same time. As a second example, an initial transfer of a coordinator-initiated transfer set and the response in an allocator-initiated transfer set both go from coordinator to allocator and can happen at the same time. As a third example, the response in a coordinator-initiated transfer set and the third leg of an allocator-initiated transfer set both go from allocator to coordinator and can happen at the same time. To deal with the foregoing, each transfer may contain sequence information. The receiver simply ignores transfers or messages which are received out of sequence and acts on the most up-to-date information that it receives.

The information transfers as described are inherently asynchronous. The individual transfers may be packaged up in one-way messages devoted to sending all pending transfers going between a particular pair of components, one of which will always be the allocator. If the available communication infrastructure that may be utilized in an embodiment makes it convenient, two such one-way messages may be combined as the request and response of an RPC (remote procedure call). A one-way message implementation may utilized two message types denoted as AllocToCoordMsg and CoordToAllocMsg. An AllocToCoordMsg may include: a unique identifier (id) used in the fashion of an NFSv4.1 session id (e.g., allowing for determination of the FS, the allocator i, this is from and the restart instances for the participating components), and a variable-length array of AllocSideXfr structures (e.g., sequence information in these structure may be relative to the session denoted by the session id above).

A CoordToAllocMsg may include a unique id used in a manner of an NFSv4.1 session id (as described above), and a variable-length array of CoordSideXfr structures (e.g., sequence information in these structures may be relative to the session denoted by the session id above).

An embodiment utilizing an RPC-style implementation may utilize two procedures whereby a first of the procedures has an AllocToCoordMsg as the request and a CoordToAllocMsg as the response, and the second procedure has CoordToAllocMsg as the request and an AllocToCoordMsg as the response.

Sometimes an allocator may not receive a requested additional reservation using the normal reservation information exchange mechanism or perhaps the allocator cannot wait any longer for the requested reservation to process a request. In this case, the DSFS or other allocator may use an RPC (referred to below as ALLOC_CHECK) to obtain a "last chance" immediate answer regarding a needed allocation. The DSFS may request from the MDFS a specific amount needed for the particular request. The MDFS may return a response indicating that at the current point in time, the requested amount is available and thereby directly granting the additional requested storage. Otherwise, the MDFS returns a response failing the request since it exceeds the quota limit.

In connection with the foregoing use of an RPC ALLOC_CHECK to get an allocation answer, it should be noted that reservations are intended to be the primary means of acquiring additional storage for allocation by an allocator, and in normal operating conditions, reservations may be the only means for an allocator to ascertain that a given allocation may be made while keeping within quota limits. However, it may not be possible to solely use reservations in all situations and in certain instances, a more primitive, direct mechanism may be used particularly as $A_{CUR}$ approaches L. As an example, suppose that L–$A_{CUR}$ is n blocks. Given that multi-block WRITEs exist, the only way the coordinator can provide the reservation necessary to allocator(s) where such WRITEs will be processed is to know in advance, where they will appear and thus which allocators will need their more-than-fair share of the reservations. An RPC referred to as ALLOC_CHECK may be utilized in such situations in an embodiment. It may be used by an allocator to request a new, higher allocation bound value B to accommodate a current request. Although, the result is formally a reservation, there are a number of pragmatic handling differences that make this operation different from simply requesting a reservation increase by using an allocator initiated information transfer. As noted above, use of such an RPC may be characterized as a "last chance" mechanism. Given that ALLOC_CHECK indicates an allocation request in hand and not an anticipated need, it often will indicate failure with the understanding that the allocator will not wait for more storage to become available but will fail the request as one exceeding quota.

It should be noted that ALLOC_CHECK may also be used where it may not be practical in certain contexts to have the WRITE request actually wait for what may be a non-strictly-bounded coordinator response. For example, the protocol implementation may want to return a delay error (e.g., NFS4ERR_DELAY or NFS3ERR_JUKEBOX) after waiting for some limited time. As a result, the increase in bound may be considered as a reservation, and not an actual allocation.

What will be described is additional detail regarding reservations management. As described herein, reservations are the means by which performance degradation may be avoided due to the inherently distributed nature of quota checking in embodiments using techniques herein. As such, different suitable techniques and heuristics may be used by the coordinator in connection with selecting different R values for the allocators. Furthermore, different suitable techniques and heuristics may be used by the allocators in connection with determining the "special limit" $S_i$ whereby, upon having its allocated amount reach $S_i$, the allocator may request additional storage in the form a reservation request being issued to the coordinator. Selection of the foregoing relates to reservation management and selection of suitable values is important in efforts to avoid or reduce performance issues. For example, if $B_i$-$S_i$ is large enough so that the coordinator will be able to extend $B_i$ before $A_i$ reaches the old $B_i$, then the latency to WRITE is not increased. Even if the foregoing is achieved by making the coordinator turnaround time very low, there may be a possible overhead issue in that if $A_i$-$S_i$ is too small, then many or most WRITEs to an allocator will cause an intercomponent information transfer. Due to the asynchronous nature of these transfers, there may be no increase in latency but overhead may increase unacceptably, unless $A_i$-$S_i$ is raised so that, on average, a significant number of WRITEs must occur before a transfer (e.g., reservation request for additional storage) is initiated by an allocator. Given the foregoing and the characteristics of the implementation and the workload, a value $R_{IDEAL}$ may be established. The value selected for $R_{IDEAL}$ may provide for meeting the above-mentioned requirements for most write requests.

There are a number of situations that may result in initial reservations being made to allocators. As a first case, initial reservation may be made by the coordinator to the allocators based on activation of a quota set whereby a quota limit is assigned for the quota set as part of globally enabling quota enforcement for the file system. As a second case, initial reservations to allocators may occur in connection with coordinator initialization or reinitialization.

In connection with making initial reservations, once $A_{CUR}$ is determined, the coordinator may assign reservations in line with the size of L–$A_{CUR}$. In the case in which free space is much larger than n*$R_{IDEAL}$, an embodiment may give all allocators a reservation of $R_{IDEAL}$. In cases in which space within the quota limits is less available (e.g., total of free space and reserved space decreases as more storage is allocated), load characteristics (e.g., an amount of write or allocations made to the different allocators) may govern the choices for the reservations to be made for the allocators. Two opposite situations can be distinguished. First, allocation load may tend to be uniform among allocators and random divergences form that pattern are small and of short duration. That corresponds to a situation which files of any substantial size are striped while allocation of small files to different DSFS's is well mixed. On the other hand in contrast in connection with a second case, it may alternatively be that relatively few files are striped so that it is very possible for a single file written to a single DSFS to dominate allocation within the Quota Set for a time, with uniform use of DSFS allocation for long periods of time being an exception, rather than the rule.

In the first case described above as the amount of unallocated storage decreases below some threshold, it may be advisable to reduce the typical reservation. In the connection with the second case above as the amount of unallocated storage decreases below some threshold, rather than reducing the total reservation from $n*R_{IDEAL}$, to $n*R_{LESS}$ (adjusted R value of $R_{LESS}$ is less than $R_{IDEAL}$), an embodiment may keep the per-allocator reservation high but reduce the number of allocators getting this reservation value to a small set of components actually doing substantial amounts of allocation. For example, an embodiment may choose to keep a portion "m" (m<N) of the allocators having the highest allocation load with the current reservation amount of $R_{IDEAL}$ (or select another reservation amount which is larger than the current reservation amount) and reduce the reservation amounts associated with other remaining allocators having the lesser allocation load.

Normally, as an allocator uses up the reservation it has been given, the coordinator will provide more reservation, in a non-disruptive way. The coordinator will be able to continue this pattern as long as there remains sufficient available quota space to continue the pattern. However, at some point, reservations may be cut back or reduced and the coordinator may recall reservations. In connection with reducing reservations, the coordinator may decide and select the reservation values based on properties such as load of each allocator, intensity of allocation, and the like. The coordinator may use any such factors and techniques suitable for selecting appropriate reservation values or R values for each allocator.

In one embodiment, the coordinator may utilize any one or more of the following exemplary strategies in connection with selecting and adjusting reservation values. In connection with a first strategy, the coordinator may select reservation values R for all allocators to be a same value denoted as $R_{IDEAL}$. The coordinator may keep the reservation values for all allocators as $R_{IDEAL}$ for as long as possible such as until the amount of unallocated storage reaches some threshold as noted above. (This may be referred to as the "r-ideal approach"). As unallocated space decreases, a second strategy may be utilized whereby the coordinator may uniformally decrease all reservation values, for example, if the allocation patterns and loads of the allocators are determined to be relatively uniform. This may also be preferred, for example, when different allocators are likely to have correlated allocation requests. (This may be referred to as the "uniform approach"). As unallocated space decreases, a third strategy may be utilized whereby the revised reservation values are selected and may vary per allocator based on different allocation characteristic of the allocators (e.g., intensities of allocation by different allocators when the load is sufficiently stable to make this worthwhile). This may be a two-level approach in which a subset of m allocators get a larger reservation with the total being $(m*R_{BIG})+((n-m)*R_{TINY})$ including the extreme version in which $R_{TINY}$ is zero. The foregoing revised R values may include more than two different such R values assigned to two sets of allocators. (This third strategy may be referred to as the "non-uniform approach").

In some embodiments, the coordinator may implement only a single one of the above-mentioned three strategies. Alternatively, the coordinator may implement more than one of the above-mentioned three strategies and may vary the particular strategy based on the amount of unallocated storage at different points in time.

At some point, reservation patterns eventually result in a need for the coordinator to recall some existing reservations. The approaches given above provide an example of the issues. To further illustrate, consider the r-ideal approach which is implemented and at some point, allocated storage with respect to a quota may eventually reach a point where $L-A_{CUR}$ is less than $R_{IDEAL}*n$. If this the only strategy implemented by the coordinator in selecting reservation values, at some point the coordinator may simply stop giving out reservations when the amount of unallocated storage (e.g., as may be represented from the coordinator's viewpoint as $L-A_{CUR}$) is less than $R_{IDEAL}*n$. Without reservations being available, allocators that need to allocate storage may alternatively then use the ALLOC_CHECK RPC. At the point at which there is insufficient free space left within quota the coordinator must recall reservations so that the RPC can be responded to. Additionally, the coordinator may perform such reservation recall processing prior to such storage being needed in connection with an ALLOC_CHECK RPC call for performance reasons so as not to further delay an allocator's outstanding allocation request. As an alternative to the foregoing as may also be implemented in an embodiment in accordance with techniques herein, the coordinator may not cease granting reservations when $L-A_{CUR}$ is less than $R_{IDEAL}*n$ but may rather allows reservations of only $L-A_{CUR}/n$ (e.g., where each of the "n" allocators has a same reservation value R of $L-A_{CUR}/n$). However, as storage is further consumed, reservations will also be recalled. Similarly, even when the uniform approach is utilized, allocators that need to allocate storage may use the ALLOC_CHECK RPC. At the point at which there is insufficient free space left within quota the coordinator must recall reservations so that the RPC can be responded to. Additionally it should be noted that with the uniform approach, the coordinator also must decide what to do when reservation values are reduced for the allocators (in particular when a reservation value is substantially reduced by an amount more than some threshold). For example, the coordinator may revised reservation values and may perform reservation recall processing in connection with those allocators having substantially reduced reservation values and such allocators may simply be holding the reserved storage and not utilizing it. In the non-uniform model, the coordinator may similarly perform a reservation recall when reservation values are adjusted (e.g., reduced) by more than a threshold amount for an allocator.

In one aspect, the reservation recall goal may be characterized as simply reducing the total reserved space to some target value such as zero or some other desired value. For example, when the motivation for the reservation recall is simply to obtain storage to provide a response to an ALLOC_CHECK call, utilizing such a target value of zero for the total reserved space among all allocators is appropriate.

As described elsewhere herein, there may be other times when a reservation recall may be performed by the coordinator such as, for example, where the goal is to change the distribution of reservation values. To express what may performed more generally in connection with a reservation recall in connection with desired target reserved space values, let the following be defined:

A is the set of allocators

R is collectively the set of reservation values for A, both current and target as described below.

Cur: A→R is the current reservation values for all allocators expressed in terms of the bounds last sent to the allocator based on the current coordinator-known allocation values.

Target: A→R is the desired reservation values for all allocators.

None: A→R is a trivial target allocation defined as None (i)=0, for all i.

$A_{KNOWN}$ is defined as the sum of the last $A_i$ or current allocation values received by the coordinator from each allocator component.

For any function F: A→R, we will let SUM(F) be defined as:

$\Sigma F(i)$.

i∈A

So we can define $F_{KNOWN}$ as L−($A_{KNOWN}$+SUM(Cur)).

Based on the above, $F_{KNOWN}$ may represent the amount of free space available for further reservations that may be granted by the coordinator based on coordinator-known allocation values and current reservation values.

Now a recall process may be defined given:

A chosen function Target

A desired minimum value for $F_{KNOWN}$ referred to as $F_{TARGET}$ which is a based on the function Target. It should be noted that $F_{TARGET}$ may be specified in terms of Cur or may otherwise be 0.

Note that the processing for reservation recalls may be implemented in an asynchronous manner so that processing of any one reservation recall to one allocator should not wait inline for an allocator response.

Figure 12:
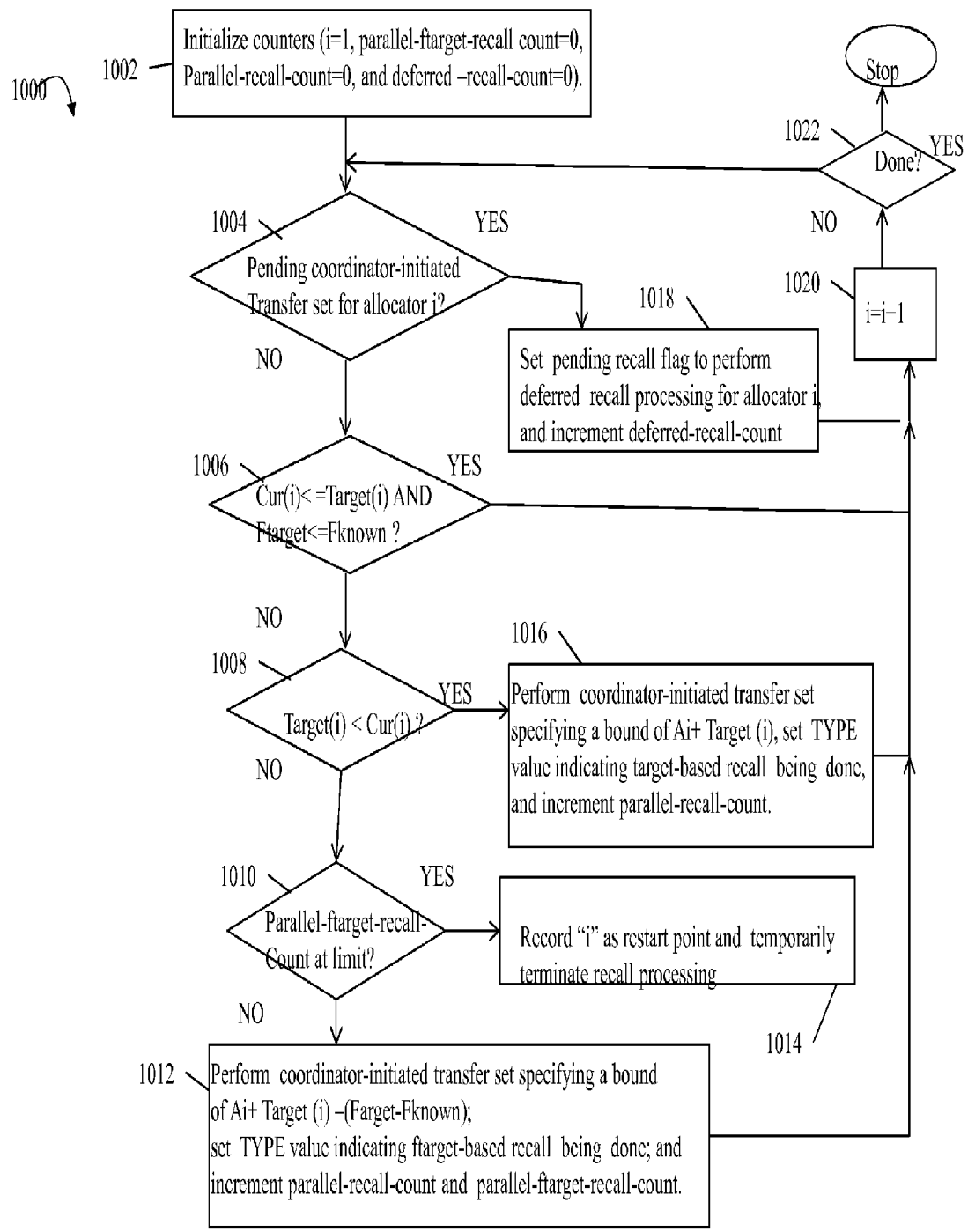
FIGS. 12, 13, and 15-19 are flowcharts of processing steps that may be performed in connection with quota management in an embodiment in accordance with techniques herein.

Referring to FIG. 12, shown is a flowchart of processing steps that may be performed in an embodiment in connection with reservation recall processing. In the following description in connection with FIG. A1, to avoid excessive space recall when doing $F_{TARGET}$-driven recalls, there is an assumed maximum number of such parallel recalls, $F_{TARGET}$-limit. The processing assumes a callback-based model where a callback is made to code of the coordinator once the recall processing has completed. Note that in the example below, there is no provision for more than one simultaneous recall operation on a quota set, assuming that each such operation with its own Target, $F_{TARGET}$, and callback can be saved on a list with the first such pending operation started after executing the callback or one which has just completed.

Processing starts at step 1002 where counters are initialized. In particular, the parallel-ftarget-recall-count, parallel-recall-count, and deferred-recall-count are each set to zero. Additionally, an allocator variable i is set to 1. At step 1004, processing begins for the current allocator i, where a determination is made as to whether there is a current coordinator-initiated transfer set active for this allocator. If so, control proceeds to step 1018 to set a pending recall flag indicating that a recall is to be evaluated for the current allocator i when the current coordinator-initiated transfer set completes. Additionally, the deferred-recall-count is incremented. Processing proceeds to step 1020 where i is increment for the next allocator. At step 1022, a determination is made as to whether processing is complete for all allocators. If so, processing stops. Otherwise, control proceeds to step 1004 for the next allocator processing.

If step 1004 evaluates to no, control proceeds to 1006 where a determination is made as to whether Cur(i)<=Target (i) and $F_{TARGET}$<=$F_{KNOWN}$. If so, no recall processing is performed for the current allocator i and control proceeds to step 1020. If step 1006 evaluates to no, control proceeds to step 1008 where a determination is made as to whether Target(i) <Cur(i). If so, control proceeds to step 1016. At step 1016, processing is performed to begin a coordinator-initiated transfer set specifying a bound of $A_i$+Target(i). Additionally a type value is set indicating a simple target-based recall is being done and parallel-recall-count is incremented. From step 1016, control proceeds to step 1020.

If step 1008 evaluates to no, processing proceeds to step 1010 where a determination is made as to whether parallel-ftarget-recall-count is at the limit indicated by $F_{TARGET}$-limit. If it is and step 1008 evaluates to yes, control proceeds to step 1014 where i is recorded as the ftarget-restart point and processing is temporarily terminated. If step 1010 evaluates to no, control proceeds to step 1012. At step 1012, a coordinator-initiated transfer set is commenced that specifies a bound of $A_i$+Target(i)−($F_{TARGET}$−$F_{KNOWN}$). Additionally, a type value is set indicating an ftarget-based recall is being done as opposed to a simple target-based recall as in connection with step 1016. Also, step 1012 increases each of parallel-recall-count and parallel-ftarget-recall-count. From step 1012, processing proceeds with step 1020.

Figure 13:
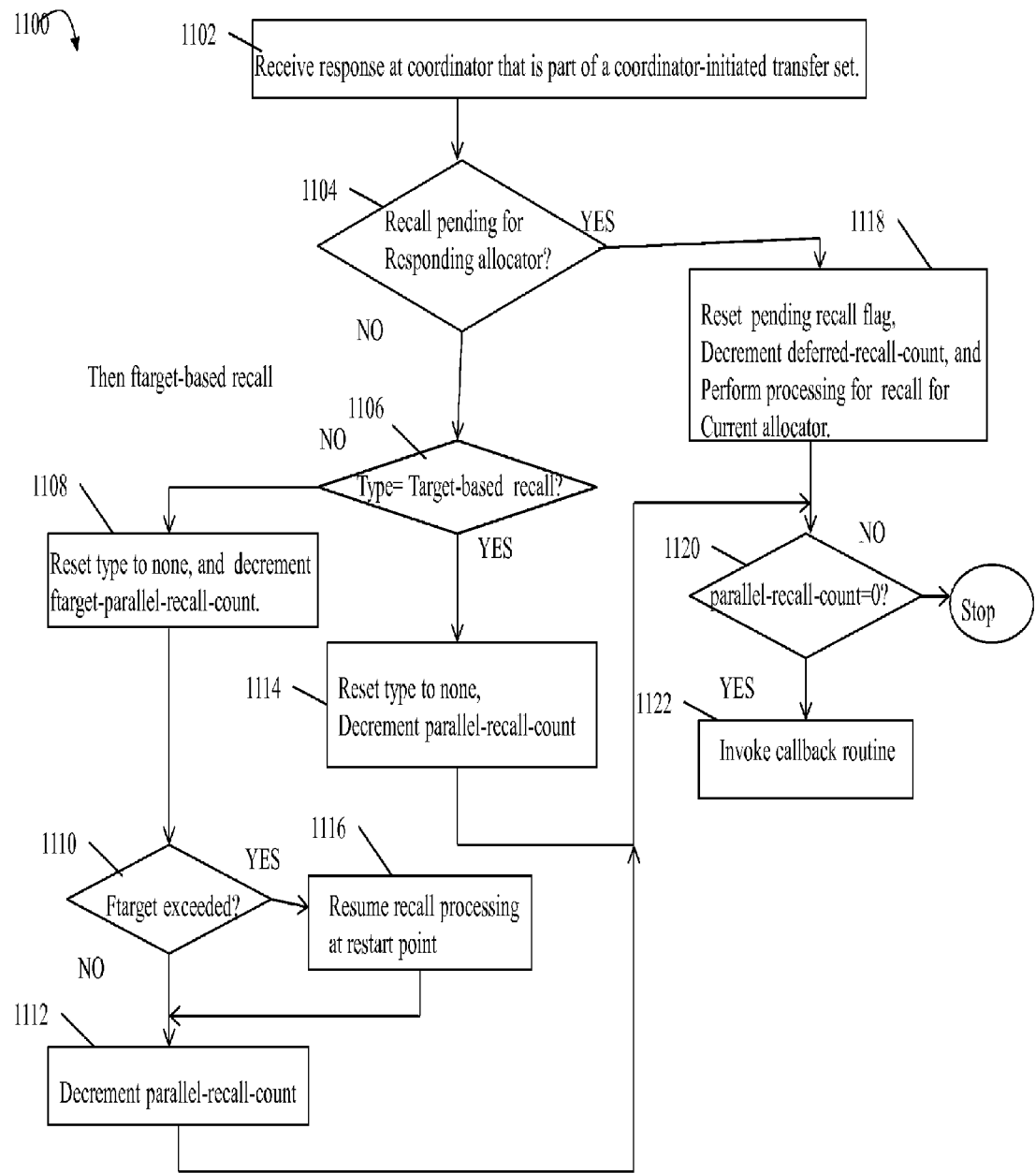

Referring to FIG. 13, shown is a flowchart of processing steps that may be performed by the coordinator upon receiving a response that is part of a coordinator-initiated transfer set. At step 1102, a response is received that is part of a coordinator-initiated transfer set. At step 1104, a determination is made as to whether the pending recall flag is on indicating that a recall is pending, for this allocator. If step 1104 evaluates to yes, control proceeds to step 1118 to reset the recall pending flag, decrement the deferred-recall-count and check recall conditions/perform recall processing for the current allocator. It should be noted that such recall processing for the current allocator may include performing processing steps and logic of FIG. A1 beginning with step 1006 (e.g., any of steps 1006, 1008, 1010, 1016, 1014, 1012 depending on the logical evaluation of steps 1006, 1008 and 1010). At step 1120, a determination is made as to whether parallel-recall-count is zero. If so, the callback routine is called since the recall is finished. If step 1120 evaluates to no, processing stops.

If step 1104 evaluates to no, control proceeds to step 1106 where the type value denoting the type of recall processing performed—either as simple target-based recall processing or ftarget-based recall processing. If step 1106 evaluates to yes indicating simple target-based processing (e.g., from step 1016) for this allocator, then reset this TYPE value and decrement parallel-recall-count. Processing proceeds to step 1120. If step 1106 evaluates to no thereby indicating that the TYPE was an ftarget-based recall, then processing proceeds to step 1108 where the TYPE value is reset, and parallel-ftarget-recall count is decremented. A determination is made at step 1110 as to whether $F_{TARGET}$-limit had been exceeded previously. If so, control proceeds to 1116 to perform recall processing from the previously saved restart point indicator. Step 1116 may include performing recall processing commencing at step 1106 for the restart point indicator and completing such processing for all remaining allocators. Once such processing has completed, processing continues with step 1112. At step 1110, if the $F_{TARGET}$ was not previously exceeded control proceeds to step 1112. At step 1112, parallel-recall-count is decremented and control proceeds to step 1120.

As described herein, reservation recall processing may be performed in response to the occurrence of one or more trigger events. For example, an occurrence of any one or more of the following may result in the coordinator performing reservation recall processing. As a first case, the coordinator may perform reservation recall processing when the coordinator proactively reassigns new reservation values such as when the amount of free or unallocated space reaches a particular threshold. As a second case, an invocation of the CHECK_ALLOC RPC call by an allocator may result in the coordinator performing reservation recall processing if there is insufficient free space to grant the request. As a third case, reservation recall processing may be performed by the coordinator responsive to a reservation request being received from an allocator and there is insufficient free space to grant the reservation request. In connection with the third case, it should be noted that the coordinator may determine there is insufficient free space if free space is zero or less than some minimum reservation size. In other words, an embodiment may have a policy defined where any reservation request that is granted should be at least the minimum size.

What will now be described are additional details regarding processing as may be performed in an embodiment in accordance with techniques herein in connection with particular operations of client requests such as, for example, write operations, remove and truncate operations, as well as some additional considerations, for example, such as changes to specified quotas for active quota sets. Some of the description in following paragraphs summarizes processing that may be performed in an embodiment which is illustrated in connection with examples described elsewhere herein.

In connection with write operations, it may be that a client write request does not result in an additional allocation. In such cases, the writes are accepted and serviced regardless of quota state. Otherwise, consider the more typical case in which the write operation results in additional storage allocation to service the request. If the allocator is able to service the allocation request by allocating storage from its reserved amount (e.g., within the limit or bound $B_i$, established by the coordinator and communicated to the allocator "i" performing the allocation), processing may include updating $A_i$ on the allocator to reflect the new WRITE allocation and performing the storage allocation requested. Additionally, if the new $A_i$ reaches or exceeds $S_i$, an allocator-initiated information transfer may be scheduled, if one is not already pending. In the case in which an allocator-initiated transfer has just been done, or one was already in process, the allocator may wait a short bounded time for a response from the coordinator hopefully granting the additional storage reservation. However, if a response from the coordinator to a pending reservation is otherwise delayed (e.g., no response received from the coordinator within a bounded time period), a delay error (e.g., NFS4ERR_DELAY or NFS3ERR_JUKEBOX) may be returned to the requesting client. A more complex case may occur when $A_i$, with the additions for the new WRITE, exceeds $B_i$ (even after trying to update $B_i$ by requesting an additional reservation. In other words, the coordinator has responded to a reservation request by denying the reservation request or supplying an insufficient reservation amount to service the request after one or more reservation requests have been made by the allocator). In this case, the allocator may request resolution from the coordinator via the ALLOC_CHECK RPC described elsewhere herein. The response to the foregoing RPC may indicate whether the write is allowed and may also provide a new reservation in the form of a new $B_i$ value.

Client requests related to allocated storage may include operations such as truncate or remove which may results in allocated storage being freed thereby decreasing one or more $A_i$ values (indicating currently allocated storage for one or more allocators each having an associated "i" value). Generally, for such client requests as may be received at an allocator, the allocator may appropriately adjust its locally maintained R and A values by increasing R and decreasing A based on the amount of storage deallocated. Additionally, the allocator may notify the coordinator regarding the revised or adjusted A value. It should be noted that the allocator may not always notify the coordinator regarding a reduced A value or increased R value responsive to a deallocation operation. For example, if the amount of storage deallocated is small or insignificant (e.g., below some threshold size such as 1 GB), the allocator may not notify the coordinator. As another example, the allocator may not so notify the coordinator regarding the deallocation if the new or revised $R_i$ (after the deallocation) is still at or below the $R_i$ last received by the coordinator.

It should also be noted that if the deallocation is quite large (e.g., above some specified threshold that makes recomputation of reserved amounts worthwhile), the coordinator may accordingly recompute one or more of the reserved amounts to increase the reservations and also the B values for the allocators. The coordinator may then notify the allocators regarding the increased B values due to the deallocation. More generally, when the coordinator is notified of the new space availability, its actions will depend on the new value of L-A<small>KNOWN</small>. If it has changed substantially, the effect will be to move the reservation regime upward toward or possibly all the way back to the ideal initial reservation situation in which free space is above n*R<small>IDEAL</small>. The coordinator may send coordinator-initiated information transfers to all or some allocators in order to raise their reservation values.

Additionally, it should be noted that some deallocation operations may be forwarded by the client directly to the DSFS for processing whereas other dealloaction operations may require that the MDFS be notified of the operation due to semantics of the particular operation requiring additional MDFS processing. For example, in one embodiment, the remove operation may be applied to non-file objects in which case the only quota space to be released may be on the MDFS-as-allocator (e.g., if MDFS was charged storage allocations in the first place). For further illustrate, remove operations may also affect storage charges to MDFS as an allocator for directory entries removed, attribute storage charges, and the like (e.g., if MDFS was charged storage allocations for such things in the first place). If the file or other storage object being removed has data stored on more than one DSFS allocator, each such DSFS affected by the operation needs to be notified to adjust it's A and R values. In such cases, the remove operation may be initially sent to MDFS which then notifies all affected DSFSs regarding the remove operation.

A client request may also modify attribute information of files, directories and/or other file system objects. In this case, the attribute modified may result in a change of ownership, group, and the like thereby affecting current storage allocations. For example, consider a change in ownership attribute of a file from user1 to user 2. MDFS may update the file metadata to reflect this change and also update its information used in connection with quota management. MDFS may then notify the appropriate one or more DSFSs regarding this change in file attributes of ownership and each notified DSFS performs processing to adjust the ownership and allocations for each user. For example, for simplicity of illustration, assume FILE 1 has a first portion of its data stored on DSFS1 and a second portion of its data stored on DSFS2. DSFS1 decreases its allocated amounts for user 1 by the size of the first portion and increases its allocated amounts for user 2 by the size of the first portion. Similarly, DSFS2 decreases its allocated amounts for user 1 by the size of the second portion and increases its allocated amounts for user 2 by the size of the second portion. It should be noted that an embodiment may not allow user2 further allocations should such change in ownership cause user2's quota limit L to be exceeded.

An embodiment may also allow for changes to quotas where such a change may be an increase or a decrease in a quota for a currently active quota set. Generally, the MDFS makes adjustments to reservations based on any such quota increase or decrease. In response to quota changes where the quota is increased, the MDFS may want to recompute reservation amounts for the DSFSs if the increase is more than a threshold amount and may then accordingly notify the DSFSs regarding any increased B values. In the case where the quota decreases, the MDFS may perform processing to recall reservations where possible (e.g., such as down to zero or some other value). If the total current allocations across all allocators for a particular quota set is over the revised lowered limit L, then any further allocations may be rejected until the total allocations (e.g., $A_{KNOWN}$ on the coordinator) is below the revised L.

An embodiment may provide for quota activation and inactivation with respect to a quota set. If a quota set has a quota limit being enforced, then the quota set may be characterized as active or an active quota set. In contrast, if the quota set has a quota limit and such limit is not currently being enforced, then the quota set may be characterized as inactive or an inactive quota set.

It should also be noted that an embodiment utilizing techniques herein for quota management may make simplifying assumptions thereby placing restrictions regarding other aspects of the file system. For example, an embodiment may not allow or may otherwise place restrictions on renaming operations, link operations, and the like, as may be supported in an embodiment. To further illustrate, an embodiment may, for example, not allow a file to renamed from one quota tree to another quota tree, may not allow overlapping quota trees, may not allow an entity to be linked from one quota tree to another, and the like.

During operation, one or more of the file system components described herein may experience failure. For example, in connection with a single component failure, the coordinator may fail. In this case, it is assumed that no allocator has also failed. Upon restarting, the coordinator may perform processing to obtain needed information for quota management. This may be done in any suitable manner. For example, the coordinator may have such information (e.g., regarding quotas) stored in persistent non-volatile storage. Upon restart, the coordinator may read such information from the storage. The coordinator may interrogate and obtain current allocation amounts from each allocator. In connection with a single component failure, a single allocator may fail. In this case such as where the allocator is a DSFS, the DSFS may determine its allocations from persistently stored metadata.

In considering different failure scenarios, it may also be that multiple file system components are in a state of failure the same time. In the case where both failing components are allocators, restarting the allocators and obtaining needed information for quota management may be as described above in connection with a single allocator failure. As a variation to the foregoing with two component failure, one of the failing components may be an allocator and the second failing component may be the coordinator. In this case, the MDFS as coordinator may restart. One or more of the failing DSFSs also being restarted may be slow to come up so that not all DSFSs are available on line when MDFS resumes processing. As a result, MDFS cannot interrogate all DSFSs to obtain current allocations. In this case, the MDFS may obtain current allocations for the one or more DSFS which is not currently available from the DSFS's persistently stored information where such information includes the current allocations for the DSFS. Additionally, recovery processing for MDFS and DSFS failure may perform a quota check include reading persistently stored allocations and verifying, such as using file system checking utility FSCHECK, that such allocations correctly reflect the contributions allocated to each file for the user (or quota set). In one embodiment, information persistently stored for an allocator such as a DSFS may include its current allocation or locally maintained A value and may optionally include other information such as the allocator's current B and/or R values (e.g., at least its current A value and possibly other information such as described in connection with examples herein in FIGS. 4, 5, and others). Information persistently stored for a coordinator such as an MDFS may include quota limits for quota sets, and may optionally include other information such as maintained A, B and/or R values for each allocator (e.g., at least quota limits and possibly other information such as described in connection with examples herein in FIGS. 4, 5, and others).

As described herein, the techniques for quota management and associated quotas may be utilized generally in connection with any quota set. One such quota set may be those files, or more generally, file system objects, having a particular attribute such as related to a ownership. More generally, the quota set may be determined as a set of file system objects based on one or more attributes such as, for example, an attribute denoting a particular group, objects belonging to a particular quota tree, and the like. In connection with quota trees, a quota tree may be created and defined, for example, as all objects included in a particular subtree having a particular parent or root node in the file system namespace. As described herein, a quota may be assigned to the quota tree so that all files created in the quota tree may be collectively subjected to this enforced quota tree limit. As files in the quota tree are created, each such file may have an attribute indicating that the file belongs to the quota tree. Attribute information for files and other file system objects may be stored on the MDFS as well as on the various DSFSs which include data for such objects. In this manner, the DSFS may enforce a quota tree limit for a given quota tree across objects (e.g., all files having an attribute indicating that the file belongs to a particular quota tree are subject to the quota for the particular quota tree). The quota limit, whether based on per-user, per quota tree, and the like, may utilize all techniques as described herein for management of the quota limit. In other words, the quota tree limit may be partitioned among the allocators, subject to corresponding A, R and B values, subject to reservation recalls, and the like, in a manner similar to which the foregoing examples illustrate per-user quota limits.

Figure 14:
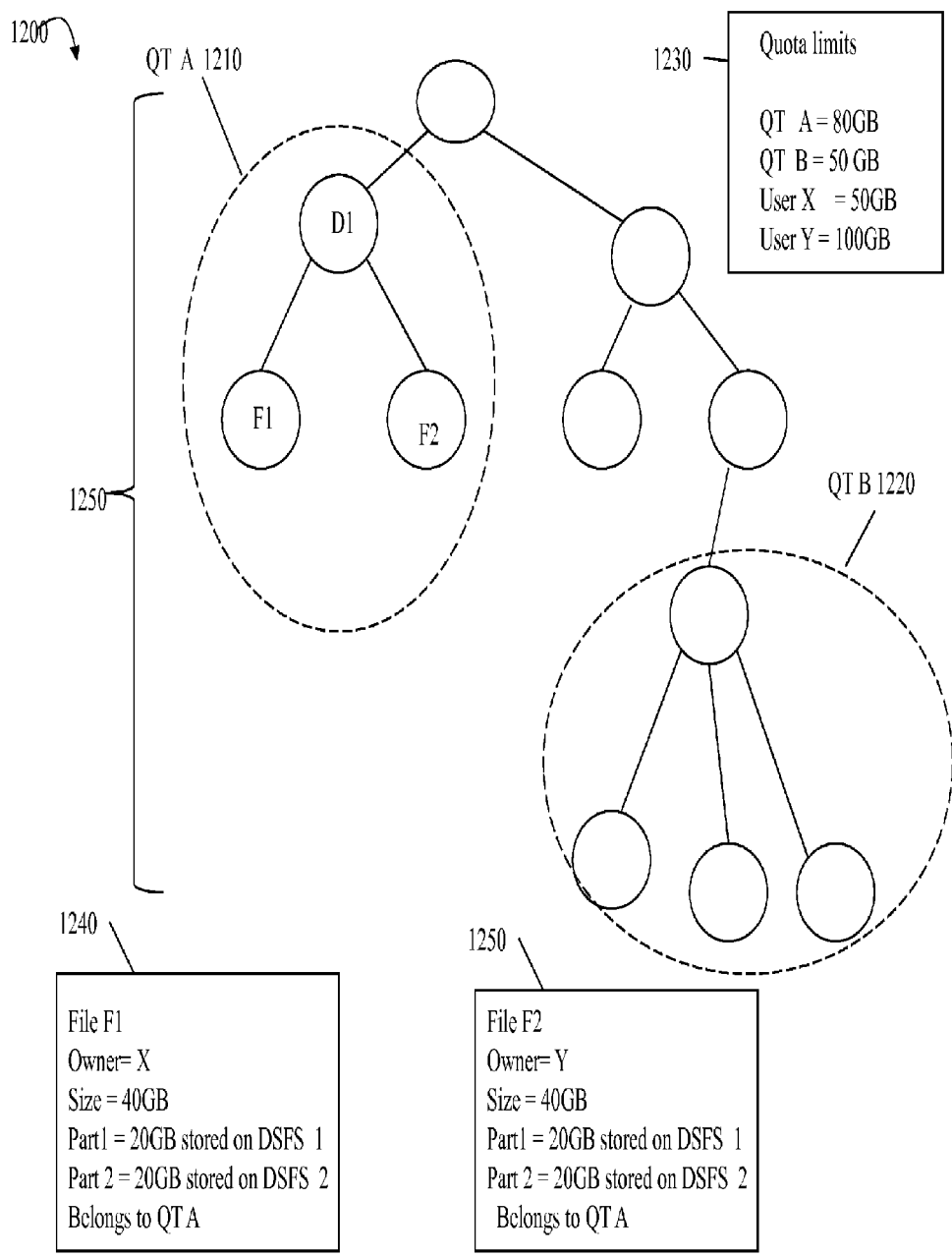
FIG. 14 is an example illustrating application of multiple quotas for a quota tree in combination with per-user quotas in connection with quota management in an embodiment in accordance with techniques herein.

Referring to FIG. 14, shown is an example illustrating use of quota limits in connection with quota sets in accordance with one embodiment utilizing techniques herein. In the example 1200, included is a tree structure 1250 representing the entire federated distributed file system namespace. Two quota trees, quota tree (QT) A 1210 and QT B 1220, may be defined as illustrated whereby each such quota tree maps to a portion of the namespace represented as a subtree. Element 1230 denotes the different quota limits that may be in effect whereby QT A has a quota limit of 80 GB, QT B has a quota limit of 50 GB, user X has a quota limit of 50 GB and user Y has a quota limit of 100 GB. Included in QT A is a directory D1 with two files F1 and F2. F1 has metadata information as denoted in 1240 and F2 has metadata information as denoted in 1250. In this example, there may be an MDFS as the coordinator and two DSFSs-DSFS1 and DSFS2—each being an allocator. As indicated by metadata 1240, F1 belongs to QT A, has user X as its owner, and is 40 GB in size (e.g., its file data or content) of which 20 GB (e.g., part 1) is stored on DSFS1 and 20 GB (e.g., part 2) is stored on DSFS2. As indicated by metadata 1250, F2 belongs to QT A, has user Y as its owner, and is 40 GB in size (e.g., its file data or content) of which 20 GB (e.g., part 1) is stored on DSFS1 and 20 GB (e.g., part 2) is stored on DSFS2. An operation resulting in a further storage allocation for file F2 is subject to enforcement of two quota limits—the first being the quota limit=100 GB based on ownership=user Y and the second being the quota limit=80 GB based on the total aggregate storage allocated for QT A. Currently, based on files that include the attribute indicating QT A membership, the total current QT A allocation is 80 GB (e.g., whereby files F1 and F2 allocations each contribute 40 GB for a total of 80 GB). Assume that user Y now performs a request for a write operation to file F2 resulting in an allocation request for an additional 10 GB to file F2. In such a case, granting such an allocation would collectively result in file F2 having a size of 90 GB, QT A have a revised allocation of 90 GB and user Y having a revised allocation of 50 GB (assuming for simplicity that Y is not the owner of any other files). Such an allocation request for the write operation is not allowed and fails in an embodiment in accordance with techniques herein due to the QT A limit of 80 GB being exceeded if the additional 10 GB is allocated. However, it should be noted that the allocation would not violate or exceed the quota limit specified for user Y of 100 GB. However, since the example is applying two quota limits, the allocation request may fail if either one or both of the quota limits is exceeded. As a variation, if there were not quota tree limits in effect and only the user quota limits in effect, the allocation for the additional 10 GB would be granted. In connection with the foregoing applying both the QT quota limits and the per-user quota limits, the end result is the same whether the write operation is sent directly to the MDFS, DSFS1 or DSFS2. It should be noted that if the request is sent to one of the DSFSs rather than the MDFS, the processing performed to make such a determination may vary as described above but the end result will be the same in that the write operation and associated allocation request for 10 GB is not allowed.

As a further variation to the above of FIG. 14 where both QT and user quota limits are in effect, consider an attempt by user X to create a new file in QT B having a size of 30 GB. Further, let the total current allocation for all files in QT B=10 GB and total current allocation for all user X's files be 40 GB. In this case, the allocation request to create the new file will fail due to exceeding the user X quota limit of 50 GB (e.g., 40 GB for current allocation+requested additional 30 GB allocation=70 GB thereby exceeding the 50 GB user X quota limit) but not exceeding the QT B limit of 50 GB (e.g., 10 GB for current allocation+requested additional 30 GB allocation=40 GB thereby not exceeding the 50 GB QT B quota limit).

What will now be described are flowcharts of processing steps that summarize processing as described above. In connection with the following flowcharts, assume that there is only a single quota limit for a single quota set such as for a per-user quota limit on storage for objects of the file system having a particular owner.

Figure 15:
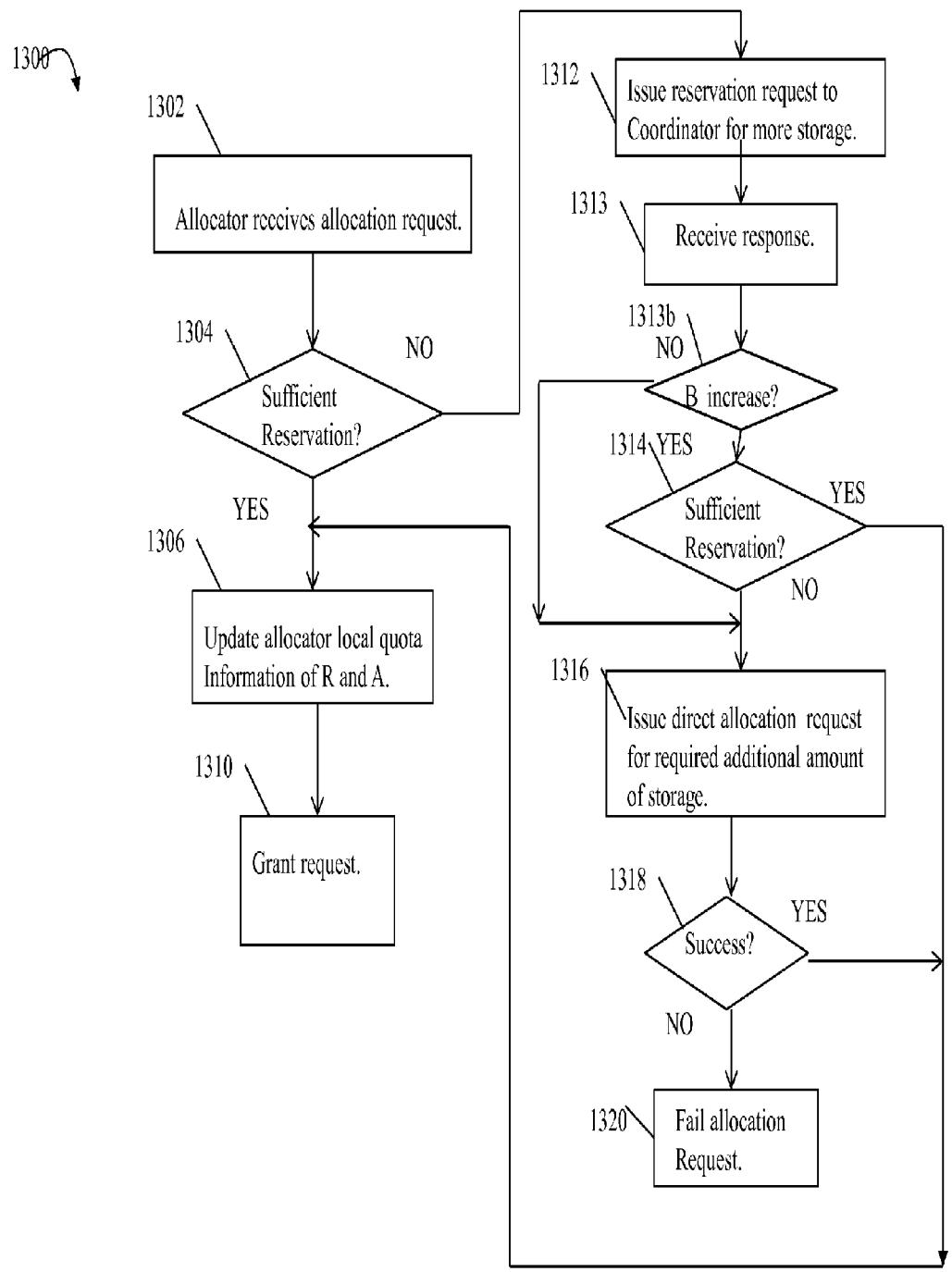

Referring to FIG. 15, shown is a flowchart of processing steps as may be performed by an allocator in an embodiment in accordance with techniques herein. FIG. 15 summarizes processing as described above such as when the allocator is a DSFS. At step 1302, the allocator may receive a request from a client whereby additional storage allocation is required to service the request such as in connection with a write operation request. At step 1304, a determination is made as to whether the allocator has a sufficient amount of storage in its reservation. If step 1304 evaluates to yes, control proceeds to step 1306 to update the allocator's local quota management information of R and A with respect to the particular user's storage allocation. At step 1310, the request is granted. If step 1304 evaluates to no, control proceeds to step 1312 where the allocator issues a reservation request to the coordinator for more storage. Additional detail regarding processing performed by the coordinator to which the request is issued in step 1312 processing is described in connection with FIG. 16 below. At step 1313, the allocator receives a response from the coordinator. The response may include a B value for the allocator whereby the B value may be the new revised bound or limit as partitioned from the entire quota limit by the coordinator for the allocator. As described in more detail below, the response received in step 1313 is sent from the coordinator as a result of processing described in connection with FIG. 16. At step 1313*b*, the B value returned in the response may be examined where a determination is made as to whether the B value in the response has increased with respect to the previous B value for this allocator. If step 1313*b* evaluates to no indicating that B has not increased, control proceeds to step 1316 (described below). Although not explicitly denoted in 1300 but in accordance with the protocol described elsewhere herein, if the revised B in the response received in step 1313 has been decreased, the allocator may send another message to the coordinator indicating that either the allocator is OK with the new revised B value and the allocator sends its current allocation A to the coordinator, OR that the allocator is not OK with the revised decreased B value (e.g., since its current A is more than the revised B as sent by the coordinator) and the allocator sends its current allocation A to the coordinator (indicating that the allocator's new revised B value is equal to its current allocation A).

If step 1313*b* evaluates to yes indicating that B has been increased, a determination is made in step 1314 as to whether the allocator now has sufficient reservation amount of storage for the allocation request. If step 1314 evaluates to yes, control proceeds to step 1306. If step 1314 evaluates to no, control proceeds to step 1316 where the allocator issues a direct allocation request to the coordinator for the required additional storage amount needed. Step 1316 may include performing the ALLOC_CHECK RPC described elsewhere herein. At step 1318, a determination is made as to whether the request from step 1316 was granted. If so, control proceeds to step 1306. Otherwise, control proceeds to step 1320 to fail the allocation request. Implicit in step 1320 is performing any needed updates to the locally stored quota management information per revised B value received in step 1313.

Figure 16:
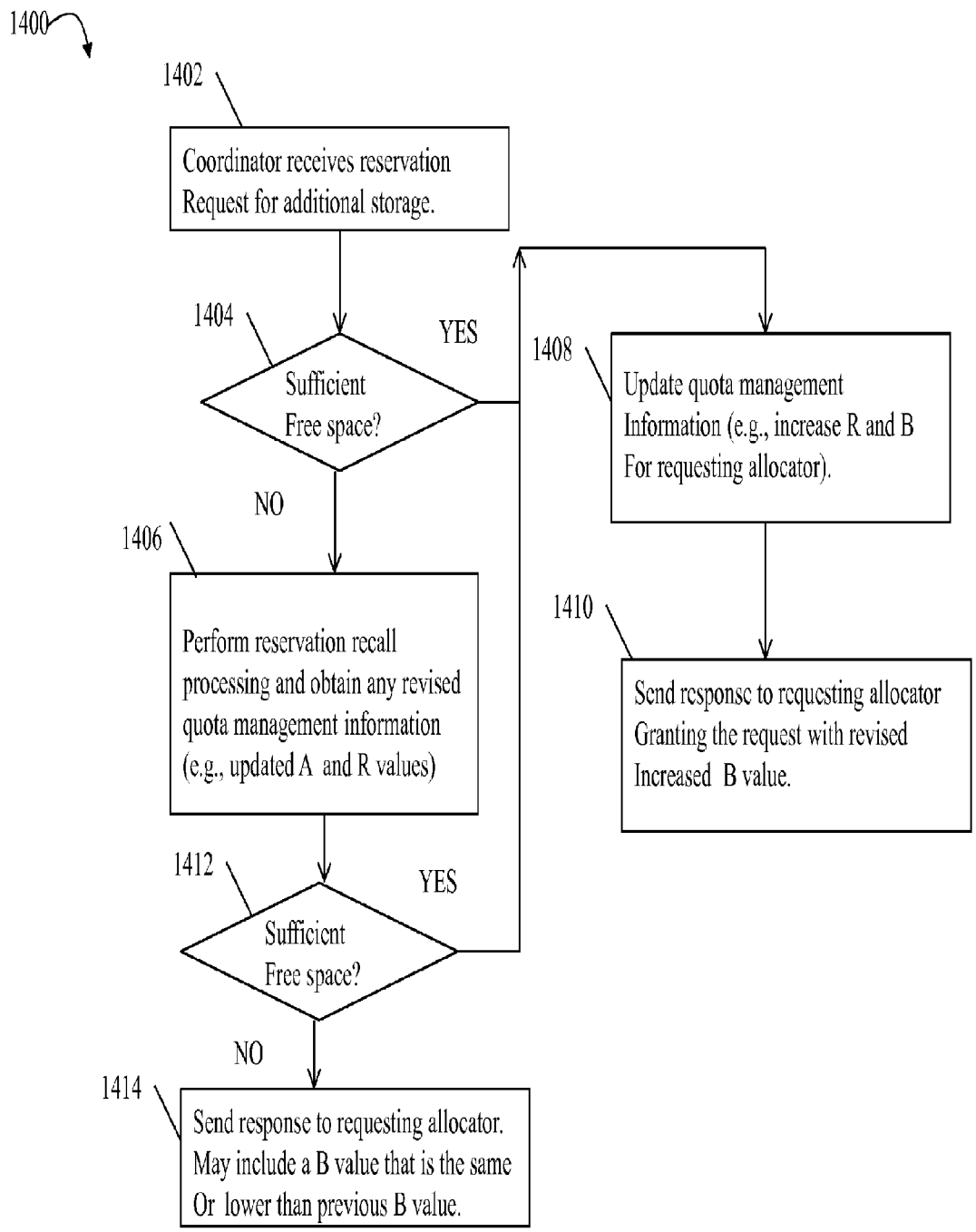

Referring to FIG. 16, shown is a flowchart of processing steps as may be performed by a coordinator in an embodiment in accordance with techniques herein. FIG. 16 summarizes processing as described above in connection with a request issued in step 1312 of FIG. 15 where the request is issued to a coordinator from an allocator and the request is a reservation request for additional storage. At step 1402, the coordinator may receive a reservation request from an allocator for additional storage. This request received in step 1402 is that request issued from an allocator in step 1312 processing of FIG. 15. At step 1404, a determination is made as to whether the reservation request may be serviced from free space. If step 1404 evaluates to yes, control proceeds to step 1408 to update quota management information of the coordinator (e.g., increase R and B for the requesting allocator and decrease free space). At step 1410, a response is sent to the requesting allocator granting the reservation request with a revised increased B value. With reference back to FIG. 15, the response sent in step 1410 is that response described above which is received by the allocator in connection with step 1313.

If step 1404, evaluates to no, control proceeds to step 1406 to perform reservation recall processing and obtain any revised quota management information (e.g., updated A and R values). At step 1412, a determination is made as to whether there is now sufficient free space to grant the reservation request and increase the requesting allocator's B value. If step 1412 evaluates to no, control proceeds to step 1414 where a response is sent to the coordinator that includes a B value that is the same or less than the previous B value last communicated to the allocator. It should be noted that if B is decreased, a further message from the allocator may be expected as described elsewhere herein indicating whether the allocator is able to accept the revised B. If step 1412 evaluates to yes, control proceeds to step 1408. It should be noted that the quota management information maintained on the coordinator may be updated in connection with processing steps such as 1402 (e.g., to include the received A value from the allocator) and 1414 (e.g., if B value of allocator is revised).

It should be noted that, as described elsewhere herein, reservation recall processing may be triggered by the occurrence of events in addition to that as described in connection with FIG. 16.

Figure 17:
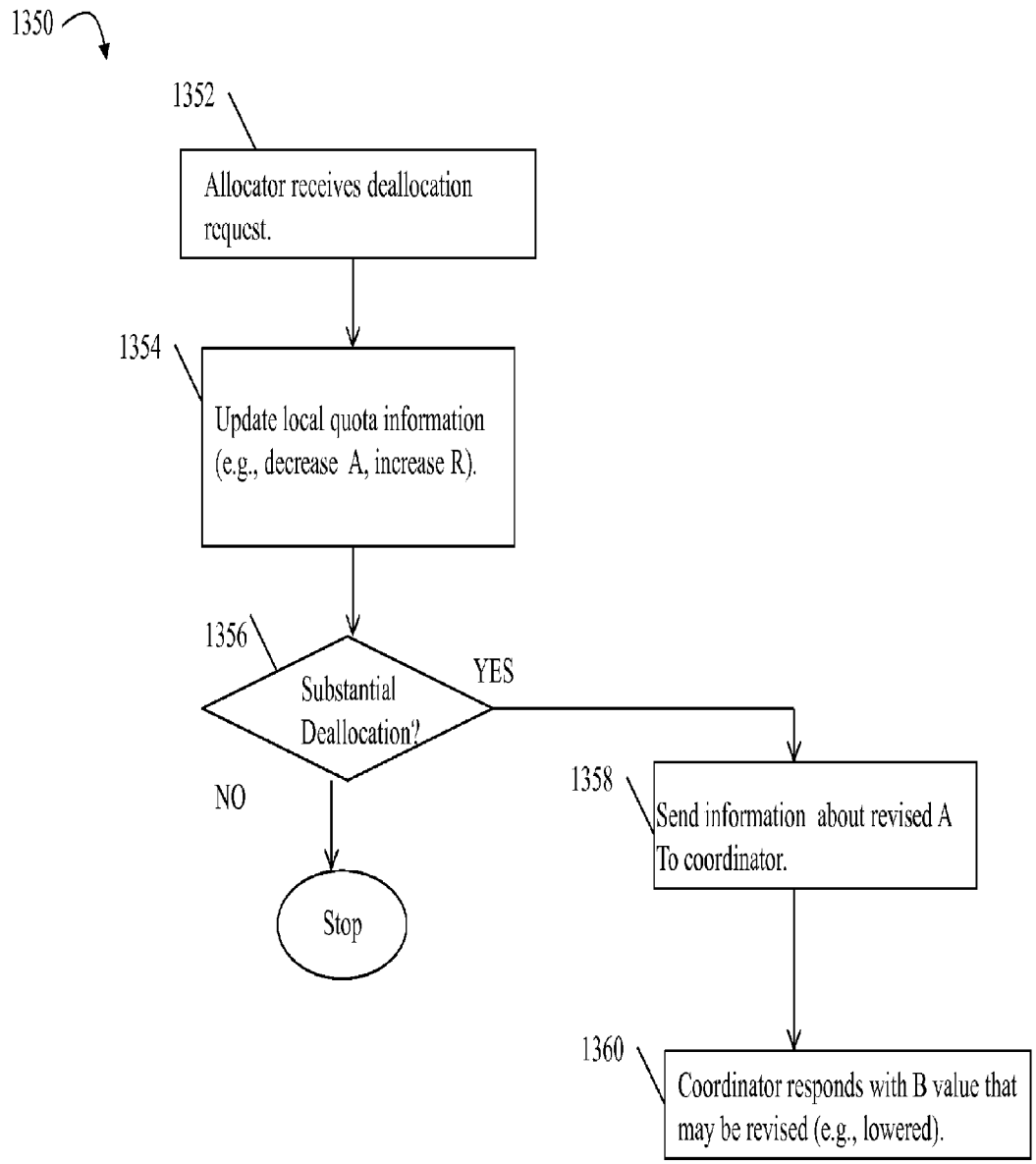

Referring to FIG. 17, shown is a flowchart of processing steps as may be performed by an allocator in an embodiment in accordance with techniques herein. FIG. 17 summarizes processing as described above such as when the allocator is a DSFS receiving a deallocation request. At step 1352, the allocator may receive a request from a client for an operation which results in a storage deallocation such as, for example, a remove or truncate operation with respect to one or more file system objects. At step 1354, the allocator updates is local quota information such as by decreasing an appropriate A value and increasing a corresponding R value. In step 1356, a determination is made as to whether the deallocation was substantial. As described herein, an deallocation may be deemed substantial if more than some specified threshold. If step 1356 evaluates to no, processing on the allocator may stop. If step 1356 evaluate to yes, processing continues with step 1358 where the allocator sends a message to the coordinator regarding the revised decreased A value on the allocator due to the deallocation. At step 1360, the coordinator sends a response to the allocator where the response indicates a B value for the allocator. The B value may be a revised B value in comparison to the B value last communicated from the coordinator and step 1360 may include updating the quota management information as maintained locally on the allocator. As described above and not explicitly included as a separate step in FIG. 17, if the revised B value is decreased in comparison to the last communicated B value, the allocator may also send an additional communication to the coordinator as described above, for example, in connection with step 1313b.

Figure 18:
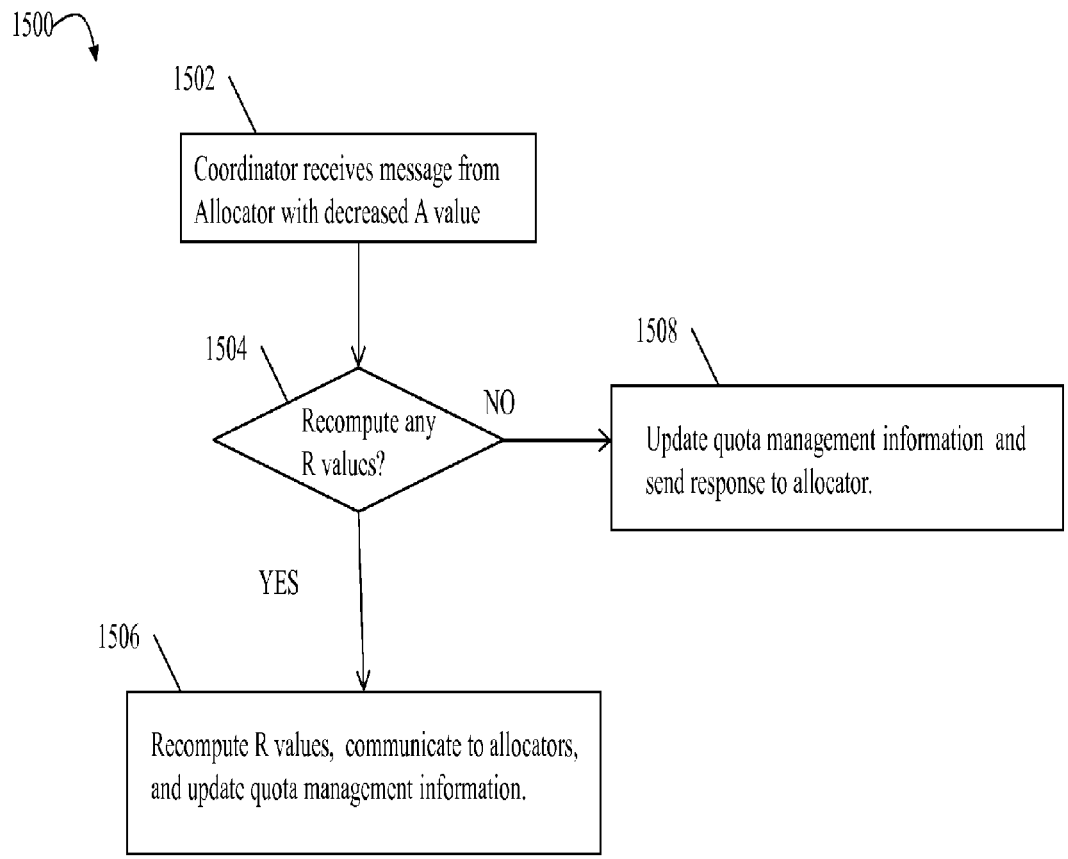

Referring to FIG. 18, shown is a flowchart of processing steps as may be performed by a coordinator in an embodiment in accordance with techniques herein. FIG. 18 summarizes processing as described above in connection with a coordinator receiving a decreased A value from an allocator. At step 1502, the coordinator received a message from an allocator with a decreased A value such as due to a deallocation described above. At step 1504, a determination is made as to whether the coordinator needs to recompute R values. As described herein, the coordinator may determine that there is a need to recomputed R values, for example, if the deallocation indicated by the decreased A value is more than a threshold amount of storage (e.g., significant). If step 1504 evaluates to no, control proceeds to step 1508 to update quota management information and send a response to the allocator. If step 1504 evaluates to yes, control proceeds to step 1506 to recompute R values, communicate any revised R values to allocators, and update quota management information of the coordinator. It should be noted that, as described elsewhere herein, recomputation of R values may be triggered by the occurrence of events in addition to that as denoted in step 1502.

Figure 19:
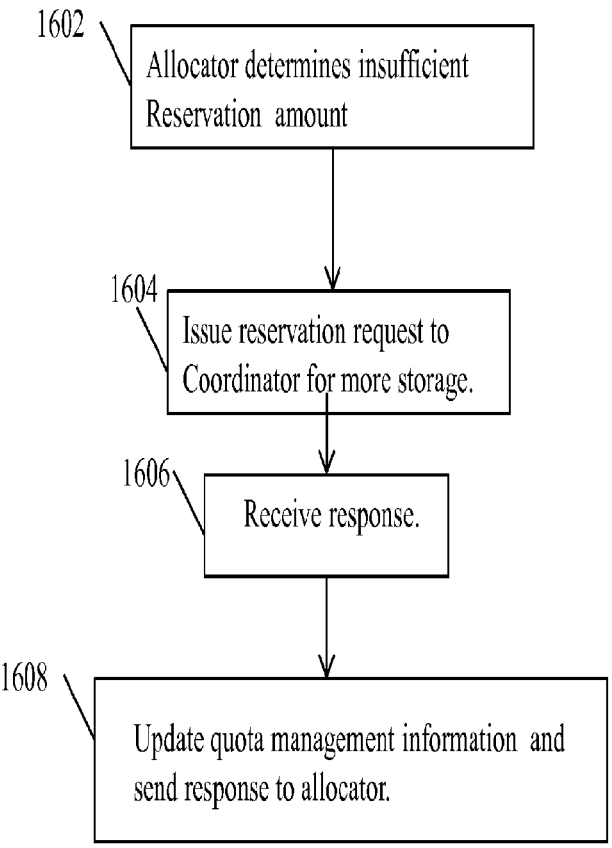

Referring to FIG. 19, shown is a flowchart of processing steps as may be performed by an allocator in an embodiment in accordance with techniques herein. FIG. 19 summarizes processing as described above in connection with an allocator monitoring its current allocation and reservation values. At step 1602, the allocator determines that is current has an insufficient amount of reserved storage (e.g., its current allocation A is within some defined threshold of B). At step 1604, the allocator issues a reservation request to the coordinator for additional storage. At step 1606, a response from the coordinator is received where the response may indicate a B value that remains the same, has been decreased or may be increased with respect to the last B value communicated by the coordinator. In step 1608, the allocator updates is local quota management information based on information sent from the coordinator in step 1606. As described elsewhere herein, if the B value is decreased, the allocator may send an additional message to the coordinator indicating acceptance of the revised B value or otherwise indicating that the revised B value has not been accepted.

An embodiment may implement the techniques herein using code executed by a processor. As will be appreciated by those skilled in the art, the code may be stored on the data storage system on a computer-readable storage medium having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for performing quota management in a distributed file system comprising:

receiving, using a processor, an allocation quota specifying an upper limit of storage available for allocation for a quota set of the distributed file system, wherein the distributed file system includes a first set of one or more metadata file systems storing metadata about files in the distributed file system and a second set of data file systems storing file content data for files of the distributed file system, wherein for at least some files in the distributed file system, metadata for each of the at least some files is stored in at least one of the metadata file systems of the first set and content data for each of the at least some files is stored in at least one of the data file systems of the second set;

partitioning, by a coordinator and using a processor, the allocation quota among the data file systems of the second set, wherein each of the data file systems of the second set is an allocator of storage, wherein each of the data file systems of the second set receives a portion of the allocation quota specifying an upper limit of storage that said each data file system has available for allocation for the quota set, wherein the portion of the allocation quota assigned to at least a first of the data file systems includes an amount of reserved storage provisionally granted to the first data file system for servicing storage requests for the quota set;

allocating, using a processor, storage for client requests, wherein said allocating is performed by each of the data file systems of the second set in accordance with the portion of the allocation quota assigned to said each data file system;

receiving, by the coordinator from a second of the data file systems of the second set and using a processor, a storage reservation request for reserved storage provisionally granted to the second data file system for use in servicing storage requests for the quota set;

determining, by the coordinator and using a processor, that there is an insufficient amount of free space of the allocation quota for the quota set to grant the storage reservation request; and responsive to said determining that there is an insufficient amount of free space, performing, by the coordinator and using a processor, first processing to recall at least some reserved storage which has been provisionally granted to one or more of the data file systems and which has not yet been allocated.

2. The method of claim 1, wherein at a first point in time, the first data file system is assigned a first portion of the allocation quota specifying an upper limit of storage that said first data file system has available for allocation for the quota set, the first portion comprising a first amount of currently allocated storage and a second amount of reserved storage provisionally granted to the first data file system for use in servicing storage requests for the quota set, said first portion having a first size that is a sum of said first amount and said second amount.

3. The method of claim 2, wherein said first processing further comprises:

sending, by the coordinator to each of one or more of the data file systems, a request to recall at least some reserved storage which has been provisionally granted to said each data file system and which has not yet been allocated by said each data file system.

4. The method of claim 3, wherein said first of the data file systems receives, at a second point in time subsequent to the first point in time, the request to recall at least some reserved storage provisionally granted at the first point in time.

5. The method of claim 4, wherein the request specifies a revised size for said first data portion, said revised size being less than said first size thereby indicating that an amount of said allocation quota partitioned by the coordinator for use by the first data file system has been reduced from said first size at said first point in time to said revised size at said second point in time.

6. The method of claim 5, wherein at said first point in time, the second amount of reserved storage has not yet been allocated to service a storage request for the quota set, and wherein between said first point in time and said second point in time, the first data file system has allocated at least some of the second amount of reserved storage since said first point in time thereby leaving a remaining amount of reserved storage space provisionally allocated to said first data file system which has not yet been allocated, said remaining amount being less than said second amount.

7. The method of claim 6, wherein said remaining amount represents a maximum amount of reserved storage of the first data file system available for recall by said coordinator at said second point in time.

8. The method of claim 6, wherein at the second point in time, the first data file system has currently allocated a third amount of storage, said third amount being greater than said revised size for said first data portion specified in the request from the coordinator.

9. The method of claim 8, wherein, responsive to the request, the first data file system sends a response to the coordinator indicating that the request to recall reserved storage has failed to recall any reserved storage from the first data file system since the third amount of storage currently allocated by the first data file system is greater than the revised size.

10. The method of claim 2, further comprising:

determining by the first data file system whether a requested amount of storage for a first client request, if allocated, would exceed the first size of the first portion, said determining including computing a second sum by adding the requested amount to the first amount and comparing the second sum to the first size of the first portion; and allocating storage for the first client request if the second sum does not exceed the first size of the first portion.

11. The method of claim 10, wherein if the second sum exceeds the first size of the first portion, the first data file system requests additional storage from the coordinator by issuing a second storage reservation request.

12. The method of claim 11, wherein, responsive to the second storage reservation request, the coordinator giants additional storage to the first data file system thereby increasing the first portion from the first size to a larger size, and wherein at any point in time, a total amount of storage representing a sum of storage capacity of the portions of the allocation quota partitioned by the coordinator across all the data file systems of the second set does not exceed the allocation quota.

13. The method of claim 1, wherein the quota set is a portion of a namespace of the distributed file system and wherein the quota set is determined using an attribute of files and directories denoting an owner.

14. The method of claim 1, wherein the quota set is a first quota set that represents objects of the distributed file system for a particular owner indicated by an owner attribute for the objects and a second quota set is a quota tree, said quota tree being a subtree of a tree that represents a namespace of the distributed file system, and wherein two allocation limits are simultaneously applied in connection with determining whether to perform a requested operation resulting in allocating additional storage for an object of the particular owner, a first of the two allocation limits denotes an allocation limit for the subtree and a second of the allocation limits denotes an allocation limit for the particular user, and the allocation quota is the first allocation limit.

15. The method of claim 1, wherein the metadata file system is the coordinator and also an allocator of storage.

16. The method of claim 1, wherein the second set of data file systems includes a plurality of data file systems and file content data for at least a first file of the distributed file system is stored in more than one of the plurality data file systems.

17. The method of claim 16, wherein the file content data for the first file is striped across the more than one of the plurality of data file systems.

18. A computer readable storage medium comprising code stored thereon for performing quota management in a distributed file system, the computer readable storage medium comprising code, that when executed by a processor, performs a method comprising:
receiving an allocation quota specifying an upper limit of storage available for allocation for a quota set of the distributed file system, wherein the distributed file system includes a first set of one or more metadata file systems storing metadata about files in the distributed file system and a second set of data file systems storing file content data for files of the distributed file system, wherein for at least some files in the distributed file system, metadata for each of the at least some files is stored in at least one of the metadata file systems of the first set and content data for each of the at least some files is stored in at least one of the data file systems of the second set;
partitioning, by a coordinator, the allocation quota among the data file systems of the second set, wherein each of the data file systems of the second set is an allocator of storage, wherein each of the data file systems of the second set receives a portion of the allocation quota specifying an upper limit of storage that said each data file system has available for allocation for the quota set, wherein the portion of the allocation quota assigned to at least a first of the data file systems includes an amount of reserved storage provisionally granted to the first data file system for servicing storage requests for the quota set;
allocating storage for client requests, wherein said allocating is performed by each of the data file systems of the second set in accordance with the portion of the allocation quota assigned to said each data file system;
receiving, by the coordinator from a second of the data file systems of the second set, a storage reservation request for reserved storage provisionally granted to the second data file system for use in servicing storage requests for the quota set;
determining, by the coordinator, that there is an insufficient amount of free space of the allocation quota for the quota set to grant the storage reservation request; and
responsive to said determining that there is an insufficient amount of free space, performing, by the coordinator and using a processor, first processing to recall at least some reserved storage which has been provisionally granted to one or more of the data file systems and which has not yet been allocated.

19. The computer readable storage medium of claim 18, wherein at a first point in time, the first data file system is assigned a first portion of the allocation quota specifying an upper limit of storage that said first data file system has available for allocation for the quota set, the first portion comprising a first amount of currently allocated storage and a second amount of reserved storage provisionally granted to the first data file system for use in servicing storage requests for the quota set, said first portion having a first size that is a sum of said first amount and said second amount.

20. A system comprising:
a first server system including a first memory, wherein code for a metadata file system storing metadata about files in a distributed file system is stored in the first memory;
a set of one or more server systems each including a second memory, wherein code for each of a plurality of data file systems is included in the second memory of one of the server systems in the set, said plurality of data file systems storing file content data for files of the distributed file system; and
wherein code for the metadata file system as stored in the first memory further comprises code that, when executed by a processor, performs a method comprising:
receiving an allocation quota specifying an upper limit of storage available for allocation for a quota set of the distributed file system;
partitioning the allocation quota among the plurality of data file systems, wherein each of the plurality of data file systems is an allocator of storage that receives a portion of the allocation quota specifying an upper limit of storage that said each data file system has available for allocation for the quota set, wherein the portion of the allocation quota assigned to at least a first of the plurality of data file systems includes an amount of reserved storage provisionally granted to the first data file system for servicing storage requests for the quota set; and
wherein code for each of the plurality of data file systems stored in the second memory of one of the server systems in the set further comprises code that, when executed by a processor, performs a method comprising:
allocating storage for client requests, wherein said allocating is performed by said each data file system in accordance with the portion of the allocation quota assigned to said each data file system; and
wherein code for the metadata file system as stored in the first memory further comprises code that, when executed by a processor, performs a method comprising:
receiving, from a second of the plurality of data file systems, a storage reservation request for reserved storage provisionally granted to the second data file system for use in servicing storage requests for the quota set;
determining that there is an insufficient amount of free space of the allocation quota for the quota set to grant the storage reservation request; and
responsive to said determining that there is an insufficient amount of free space, performing first processing to recall at least some reserved storage which has been provisionally granted to one or more of the plurality of data file systems and which has not yet been allocated.

* * * * *